US012763816B2

(12) United States Patent
Elshafie et al.

(10) Patent No.: US 12,763,816 B2
(45) Date of Patent: Oct. 13, 2026

(54) INFERRING COEFFICIENTS OF INACTIVE RECONFIGURABLE INTELLIGENT SURFACE (RIS) ELEMENTS USING MAPPING FUNCTIONS

(71) Applicant: QUALCOMM Incorporated, San Diego, CA (US)

(72) Inventors: Ahmed Elshafie, San Diego, CA (US); Hung Dinh Ly, San Diego, CA (US); Yu Zhang, San Diego, CA (US); Saeid Sahraei, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 82 days.

(21) Appl. No.: 18/701,530

(22) PCT Filed: Dec. 10, 2021

(86) PCT No.: PCT/CN2021/137082
§ 371 (c)(1),
(2) Date: Apr. 15, 2024

(87) PCT Pub. No.: WO2023/102892
PCT Pub. Date: Jun. 15, 2023

(65) Prior Publication Data
US 2024/0413855 A1 Dec. 12, 2024

(51) Int. Cl.
*H04B 7/04* (2017.01)
*H04B 17/318* (2015.01)
(Continued)

(52) U.S. Cl.
CPC ....... *H04B 7/04013* (2023.05); *H04B 17/328* (2023.05); *H04B 17/336* (2015.01); *H04L 5/0048* (2013.01)

(58) Field of Classification Search
CPC ......................... H04B 7/04013; H04B 17/336; H04B 17/328; H04L 5/0048
See application file for complete search history.

(56) References Cited

U.S. PATENT DOCUMENTS

| | | | |
|---|---|---|---|
| 2021/0384637 A1 | 12/2021 | Sciancalepore et al. | |
| 2024/0073882 A1* | 2/2024 | Yang | H01Q 3/46 |
| 2024/0178883 A1* | 5/2024 | Haghighat | H04B 7/0691 |

FOREIGN PATENT DOCUMENTS

| | | |
|---|---|---|
| CN | 112804695 A | 5/2021 |
| WO | 2021236510 A1 | 11/2021 |

(Continued)

OTHER PUBLICATIONS

Supplementary Partial European Search Report—EP21966813—Search Authority—Munich—Jul. 2, 2025.

(Continued)

*Primary Examiner* — Janice N Tieu
(74) *Attorney, Agent, or Firm* — QUALCOMM Incorporated

(57) ABSTRACT

Certain aspects of the present disclosure provide techniques for wireless communication by a network entity. For example, the network entity defines a size of reconfigurable intelligent surface (RIS) elements. The network entity further defines a set of patterns representing active RIS elements and/or inactive RIS elements, based on the size of RIS elements. The network entity transmits an indication of the size of RIS elements and the set of patterns to a RIS controller.

24 Claims, 16 Drawing Sheets

(51) Int. Cl.
*H04B 17/336* (2015.01)
*H04L 5/00* (2006.01)

(56) References Cited

FOREIGN PATENT DOCUMENTS

| | | | |
|---|---|---|---|
| WO | 2021239259 | A1 | 12/2021 |
| WO | 2021239311 | A1 | 12/2021 |

OTHER PUBLICATIONS

International Search Report and Written Opinion—PCT/CN2021/137082—ISA/EPO—Sep. 2, 2022.
ZTE., et al., "Support of Reconfigurable Intelligent Surface for 5G Advanced", 3GPP TSG RAN Meeting #93e, RP-212385, Electronic Meeting, Sep. 13-Sep. 17, 2021, Sep. 17, 2021, 6 Pages, the whole document.
Miller C.L., et al., "Efficient Channel Estimation for RIS", ICC 2021, IEEE International Conference On Communications, Jun. 14, 2021, pp. 1-6, XP033953849, 6 Pages, Section III, p. 3-p. 4.
Sattar Z., et al., "Nearly Passive Reconfigurable Intelligent Surface with Constant Phase-shifts", 2021 IEEE 32nd Annual International Symposium on Personal, Indoor and Mobile Radio Communications (PIMRC), Sep. 13, 2021-Sep. 16, 2021, Sep. 13, 2021, pp. 794-799, XP034004460, sections II and III, p. 795-p. 796, figure 3.
Sun S., et al., "Channel Estimation for Reconfigurable Intelligent Surface-Assisted Wireless Communications Considering Doppler Effect", Arxiv.Org, Cornell University Library, 201 Olin Library Cornell University Ithaca, NY 14853, arXiv:2010.00101v4 [cs.IT], Jan. 29, 2021, pp. 1-5, XP081870195, Sections III and IV, p. 3.
Supplementary European Search Report—EP21966813—Search Authority—Munich—Sep. 18, 2025.

* cited by examiner

INFERRING COEFFICIENTS OF INACTIVE RECONFIGURABLE INTELLIGENT SURFACE (RIS) ELEMENTS USING MAPPING FUNCTIONS

CROSS-REFERENCE TO RELATED APPLICATIONS

This application is a national stage application under 35 U.S.C. 371 of PCT/CN2021/137082 filed Dec. 10, 2021, which is hereby expressly incorporated by reference herein in its entirety as if fully set forth below and for all applicable purposes.

INTRODUCTION

Aspects of the present disclosure relate to wireless communications, and more particularly, to techniques for managing training of reconfigurable intelligent surface (RIS) elements.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method for wireless communication by a network entity, comprising: defining a size of reconfigurable intelligent surface (RIS) elements; defining a set of patterns representing one or more active RIS elements or one or more inactive RIS elements, based on the size of RIS elements; and transmitting, to a RIS controller, an indication of the size of RIS elements and the set of patterns.

Another aspect provides a method for wireless communication by a network entity, comprising: defining a set of bitmaps, each bitmap has a size of a number of RIS elements; and transmitting, to a RIS controller, an indication of the set of bitmaps.

Another aspect provides a method for wireless communication by a RIS controller, comprising: defining a size of RIS elements; transmitting, to a network entity, an indication of the size of RIS elements; and receiving, from the network entity, a set of patterns representing one or more active RIS elements and one or more inactive RIS elements, based on the size of RIS elements.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

DETAILED DESCRIPTION

Aspects of the present disclosure provide apparatuses, methods, processing systems, and computer-readable mediums for configuring a reconfigurable intelligent surface (RIS). In some cases, the configuration may be performed using a pattern representing active RIS elements in a RIS and training these active RIS elements (instead of all RIS elements in the RIS).

For example, a network entity and a RIS controller may communicate with each other and decide a certain pattern of active RIS elements in a RIS. The active RIS elements may be trained to determine optimal coefficient values (e.g., a phase) associated with the active RIS elements. Various processing (e.g., interpolation, extrapolation, and/or mapping) may then be performed to determine coefficient values of remaining RIS elements (e.g., inactive RIS elements) in the RIS based on the determined coefficient values associated with the active RIS elements. In some cases, the active RIS elements (e.g., ON RIS elements) may correspond to RIS elements whose coefficients are determined (e.g., based on some values/parameters and are not inferred), and the inactive RIS elements (e.g., OFF RIS elements) may correspond to RIS elements whose coefficients are determined based on coefficients of active RIS elements.

In this manner, the technique described herein may reduce overall training overhead as only the active RIS elements are trained (instead of all RIS elements) and the resulting values associated with the active RIS elements are used across remaining RIS elements.

Introduction to Wireless Communication Networks

Figure 1:
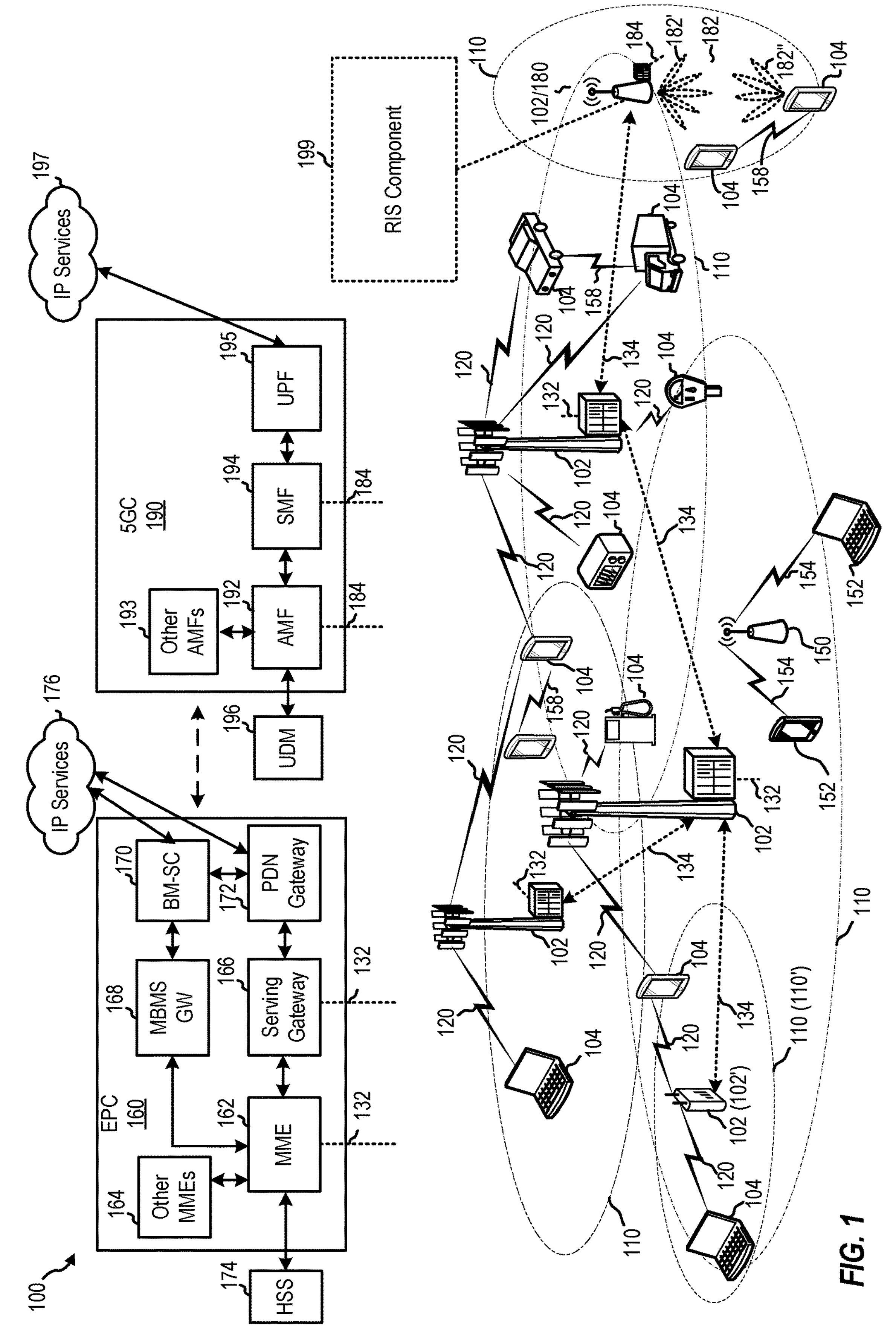
FIG. 1 is a block diagram conceptually illustrating an example wireless communication network.

FIG. 1 depicts an example of a wireless communications network 100, in which aspects described herein may be implemented.

Generally, wireless communications network 100 includes base stations (BSs) 102, user equipments (UEs) 104, one or more core networks, such as an Evolved Packet Core (EPC) 160 and 5G Core (5GC) network 190, which interoperate to provide wireless communications services.

BSs 102 may provide an access point to EPC 160 and/or 5GC 190 for a UE 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. BSs 102 may include and/or be referred to as a gNB, NodeB, eNB, ng-eNB (e.g., an eNB that has been enhanced to provide connection to both EPC 160 and 5GC 190), an access point, a base transceiver station, a radio BS, a radio transceiver, or a transceiver function, or a transmission reception point in various contexts.

BSs 102 wirelessly communicate with UEs 104 via communications links 120. Each of BSs 102 may provide communication coverage for a respective geographic coverage area 110, which may overlap in some cases. For example, small cell 102' (e.g., a low-power BS) may have a coverage area 110' that overlaps the coverage area 110 of one or more macrocells (e.g., high-power BSs).

The communication links 120 between BSs 102 and UEs 104 may include uplink (UL) (also referred to as reverse link) transmissions from UE 104 to BS 102 and/or downlink (DL) (also referred to as forward link) transmissions from BS 102 to UE 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain BSs (e.g., 180 in FIG. 1) may utilize beamforming 182 with UE 104 to improve path loss and range. For example, BS 180 and UE 104 may each include a plurality of antennas, such as antenna elements, antenna panels, and/or antenna arrays to facilitate the beamforming.

In some cases, BS 180 may transmit a beamformed signal to UE 104 in one or more transmit directions 182'. UE 104 may receive the beamformed signal from BS 180 in one or more receive directions 182". UE 104 may also transmit a beamformed signal to BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Figure 7:
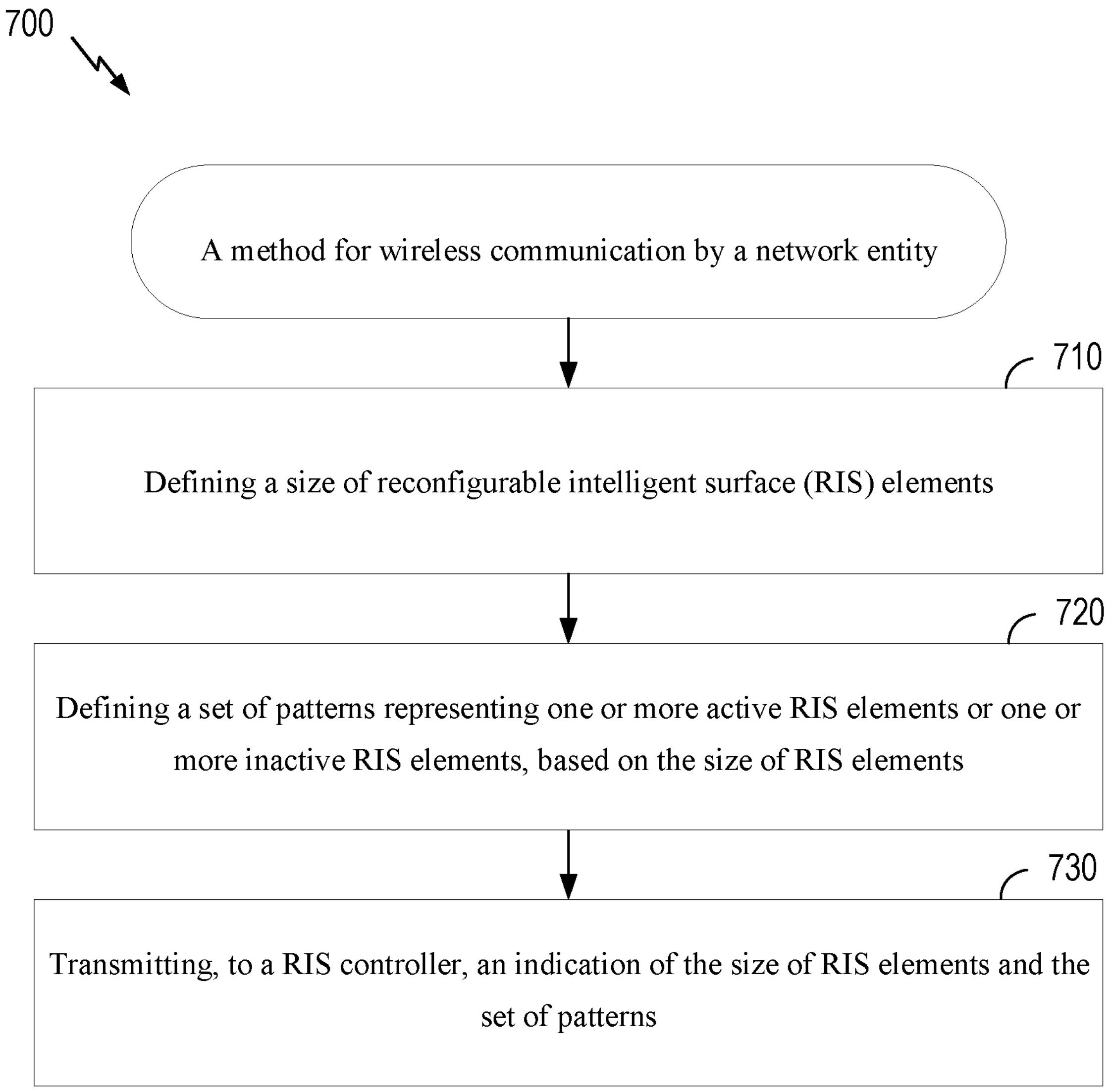
FIG. 7 is a flow diagram illustrating example operations for wireless communication by a network entity.
Figure 8:
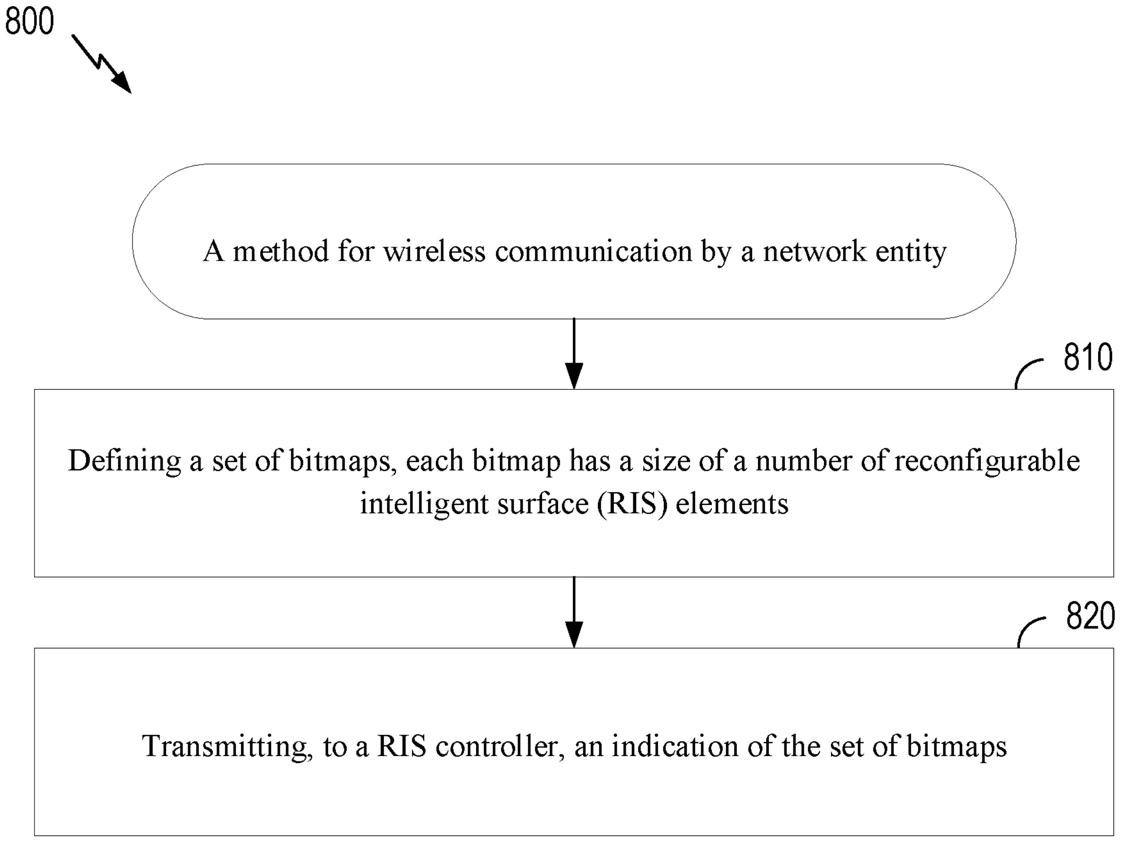
FIG. 8 is a flow diagram illustrating example operations for wireless communication by a network entity.

BS 102 includes reconfigurable intelligent surface (RIS) component 199, which may be configured to perform operations 700 of FIG. 7 and operations 800 of FIG. 8.

Figure 2:
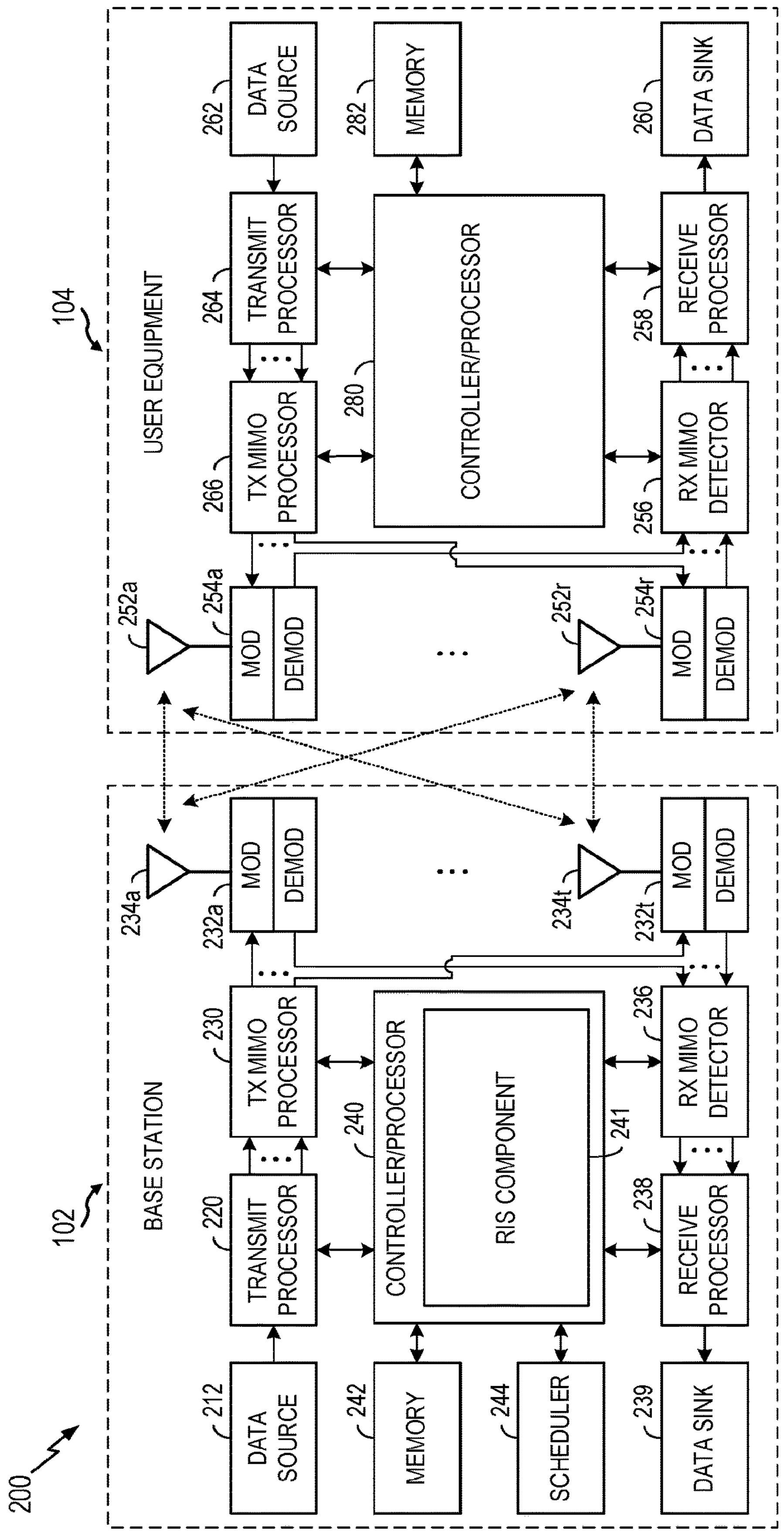
FIG. 2 is a block diagram conceptually illustrating aspects of an example base station (BS) and user equipment (UE).

FIG. 2 depicts aspects of an example BS 102 and UE 104.

Generally, BS 102 includes various processors (e.g., 220, 230, 238, and 240), antennas 234*a-t* (collectively 234), transceivers 232*a-t* (collectively 232), which include modulators and demodulators, and other aspects, which enable wireless transmission of data (e.g., data source 212) and wireless reception of data (e.g., data sink 239). For example, BS 102 may send and receive data between itself and UE 104.

BS 102 includes controller/processor 240, which may be configured to implement various functions related to wireless communications. In the depicted example, controller/processor 240 includes RIS component 241, which may be representative of RIS component 199 of FIG. 1. Notably, while depicted as an aspect of controller/processor 240, RIS component 241 may be implemented additionally or alternatively in various other aspects of BS 102 in other implementations.

Generally, UE 104 includes various processors (e.g., 258, 264, 266, and 280), antennas 252*a-r* (collectively 252), transceivers 254*a-r* (collectively 254), which include modulators and demodulators, and other aspects, which enable wireless transmission of data (e.g., data source 262) and wireless reception of data (e.g., data sink 260). UE 104 includes controller/processor 280, which may be configured to implement various functions related to wireless communications.

Figure 3B:
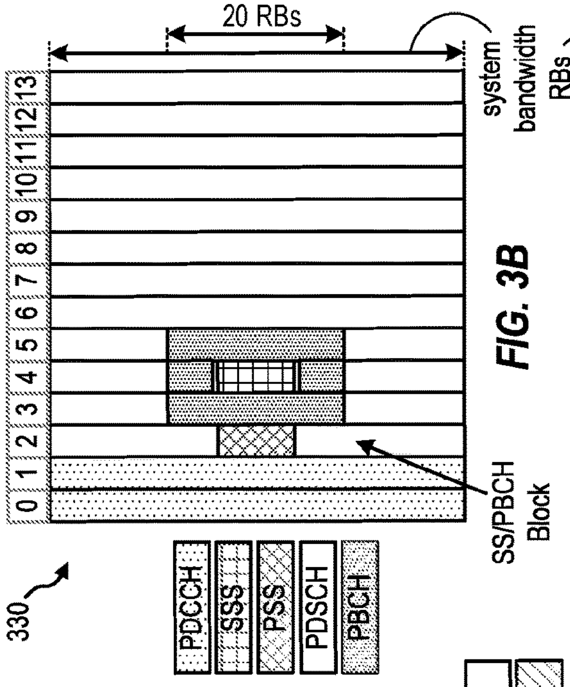
FIGS. 3A-3D depict various example aspects of data structures for a wireless communication network.
Figure 3A:
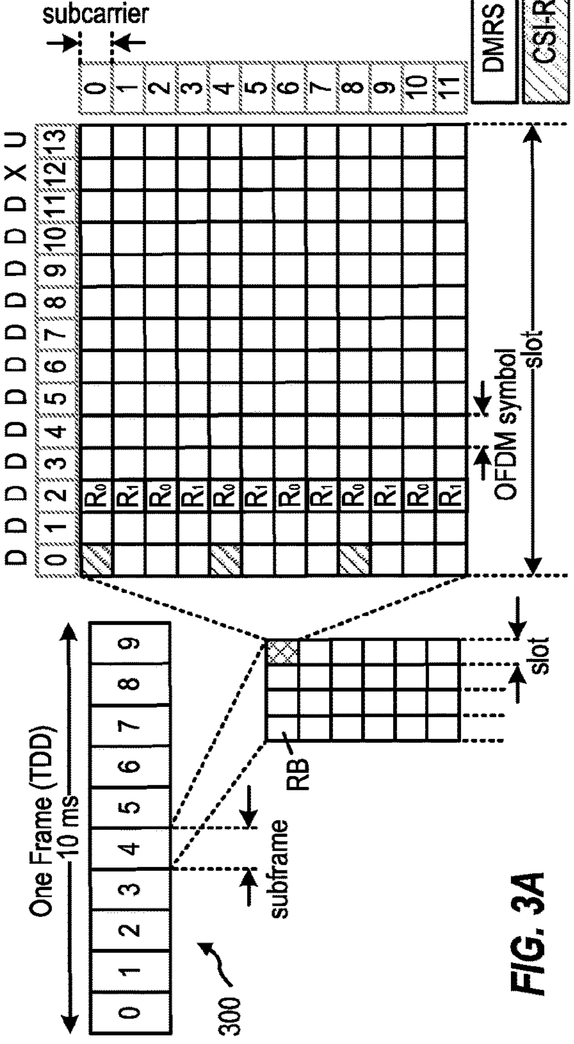
Figure 3D:
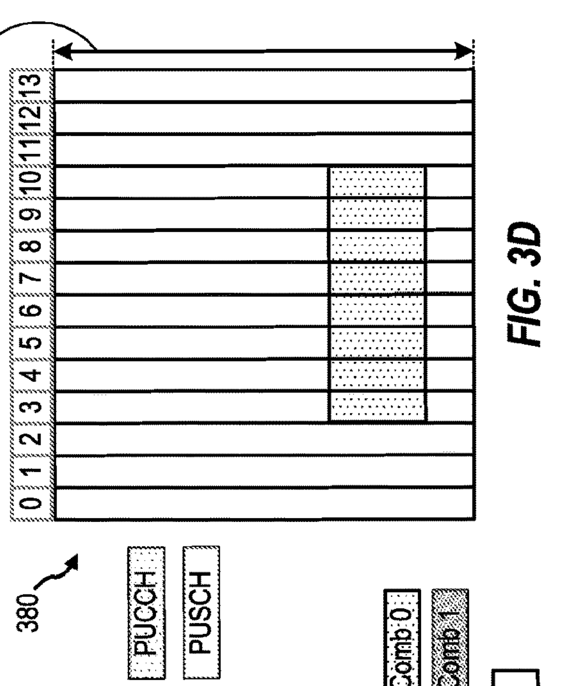
Figure 3C:
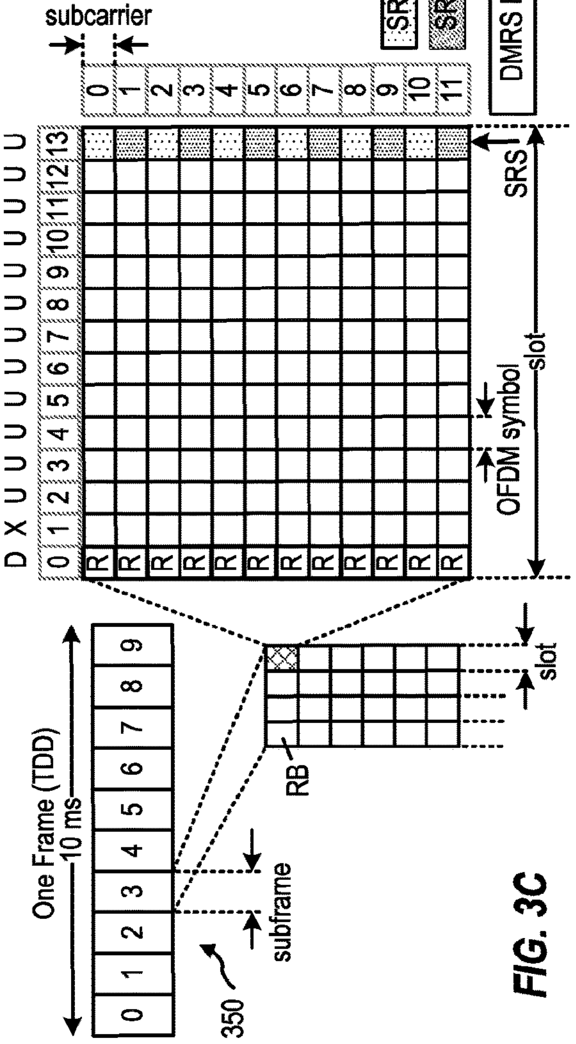

FIGS. 3A-3D depict aspects of data structures for a wireless communication network, such as wireless communication network 100 of FIG. 1. In particular, FIG. 3A is a diagram 300 illustrating an example of a first subframe within a 5th generation (5G) (e.g., 5G new radio (NR)) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to Mm Wave Wireless Communications

In wireless communications, an electromagnetic spectrum is often subdivided into various classes, bands, channels, or other features. The subdivision is often provided based on wavelength and frequency, where frequency may also be referred to as a carrier, a subcarrier, a frequency channel, a tone, or a subband.

$5^{th}$ generation (5G) networks may utilize several frequency ranges, which in some cases are defined by a standard, such as 3rd generation partnership project (3GPP) standards. For example, 3GPP technical standard TS 38.101 currently defines Frequency Range 1 (FR1) as including 600 MHz-6 GHz, though specific uplink and downlink allocations may fall outside of this general range. Thus, FR1 is often referred to (interchangeably) as a “Sub-6 GHz” band.

Similarly, TS 38.101 currently defines Frequency Range 2 (FR2) as including 26-41 GHz, though again specific uplink and downlink allocations may fall outside of this general range. FR2, is sometimes referred to (interchangeably) as a “millimeter wave” (“mmW” or “mmWave”) band, despite being different from the extremely high frequency (EHF) band (30 GHz-300 GHz) that is identified by the International Telecommunications Union (ITU) as a “millimeter wave” band because wavelengths at these frequencies are between 1 millimeter and 10 millimeters.

Communications using mmWave/near mmWave radio frequency band (e.g., 3 GHz-300 GHz) may have higher path loss and a shorter range compared to lower frequency communications. As described above with respect to FIG. 1, a base station (BS) (e.g., 180) configured to communicate using mmWave/near mmWave radio frequency bands may utilize beamforming (e.g., 182) with a user equipment (UE) (e.g., 104) to improve path loss and range.

Overview of Massive Multiple Input Multiple Output (MIMO)

$5^{th}$ generation (5G) new radio (NR) massive multiple input multiple output (MIMO) is an extension of MIMO, which groups together antennas (e.g., at a transmitter device and a receiver device) to provide better throughput and spectrum efficiency. The massive MIMO expands beyond conventional systems by adding a much higher number of antennas. The higher number of antennas helps focus energy, which brings drastic improvements in throughput and efficiency. Along with the increased number of antennas, both network and user equipments (UEs) implement more complex designs to coordinate MIMO operations. The benefits of the massive MIMO to the network and the UEs may include increased network capacity and improved coverage.

Although there are several benefits of the massive MIMO, there are also some challenges associated with the massive MIMO. For example, since a high beamforming gain is achieved by using active antenna units (AAUs), which may include power consuming hardware (e.g., individual radio frequency (RF) chains per antenna port), there is a significant increase in power consumption due to the use of AAUs.

Overview of a Reconfigurable Intelligent Surface (RIS)

As noted above, massive multiple input multiple output (MIMO) configuration increases throughput. For example, MIMO can achieve high beamforming gain by using active antenna units (AAUs) and can operate with individual radio frequency (RF) chains for each antenna port. Unfortunately, the use of AAUs may significantly increase power consumption.

To further such advantages and extend coverage, reconfigurable intelligent surfaces (RISs) may be deployed to reflect impinging waves in desired directions. In some cases, RISs may operate without substantial power consumption when they operate passively to only reflect or refract beams from a transmitter toward a receiver. In some cases, the reflection or refraction direction may be controlled by gNodeB (gNB) or a monitoring sidelink user equipment (UE).

Figure 4A:
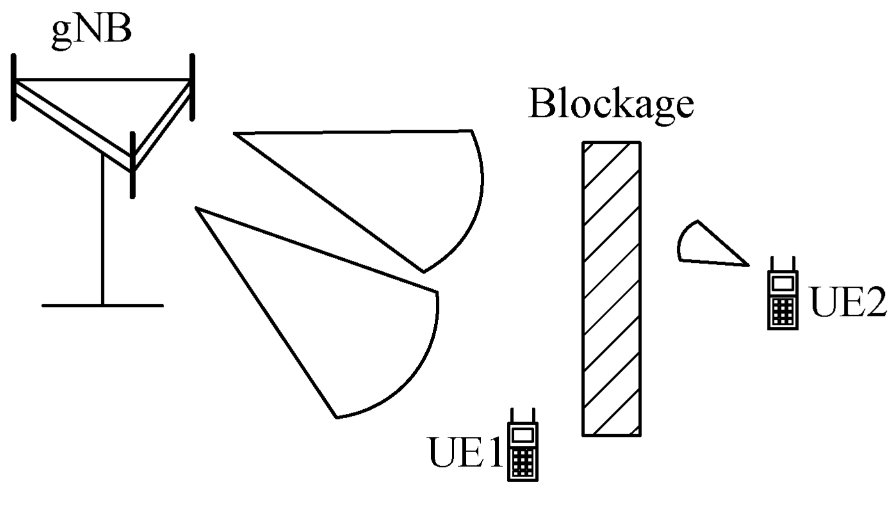
FIG. 4A illustrates example of communication blockage between wireless communication devices.

FIG. 4A illustrates an example of communication blockage between wireless communication devices. As shown, impeded by a blockage, a first network entity (a gNB) may only transmit to a first UE (UE1) and may not reach a second UE (UE2), as the blockage preventing signals from reaching UE2. The blockage also prevents UE1 from establishing sidelink communications with UE2. As such, UE2 may not be able to communicate with the gNB or UE1.

Figure 4B:
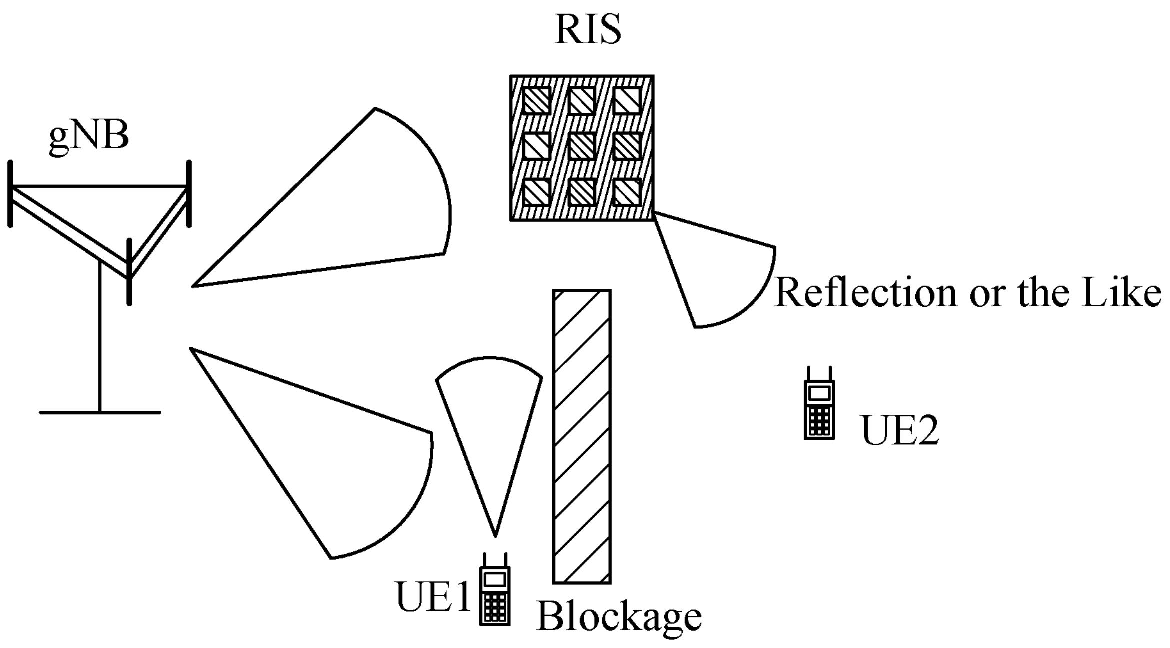
FIG. 4B illustrates example operation of a reconfigurable intelligent surface (RIS).

FIG. 4B illustrates an example of using a RIS to overcome a blockage. As shown, the RIS may be introduced to reflect or otherwise re-radiate radio signals to bypass the blockage. For example, communications between a gNB and a UE2 may be enabled by the RIS re-radiating one or more beams from the gNB toward the UE2 and vice versa. Furthermore, the RIS can also be reconfigured (i.e., directing incoming and outgoing beams at different angles) to enable a UE1 and the UE2 to establish sidelink communications.

The RIS may perform passive beamforming (BF). For example, the RIS may receive signal power from the transmitter (e.g., the gNB, the UE1, and/or the UE2) proportional to the number of RIS elements thereon. When the RIS reflects or refracts the radio signal, the RIS elements cause phase shifts to perform conventional beamforming or precoding. The phase shifts are controlled by precoding weights (e.g., a multiplier or an offset of time delay) applied to the RIS elements. For an array of RIS elements, such as an m×n rectangular matrix, for example, a respective precoding weight may be generated or specified for each of the RIS element by a RIS controller.

Figure 5A:
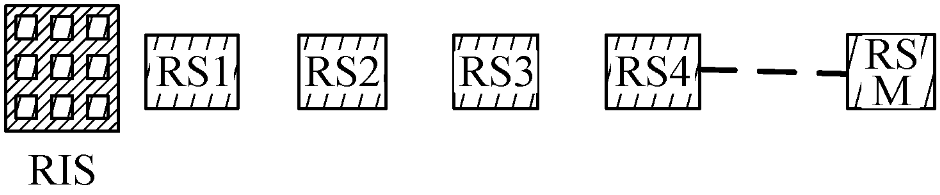
FIG. 5A illustrates a series of time division multiplexed (TDM'd) reference signals (RSs) for training a RIS.
Figure 5B:
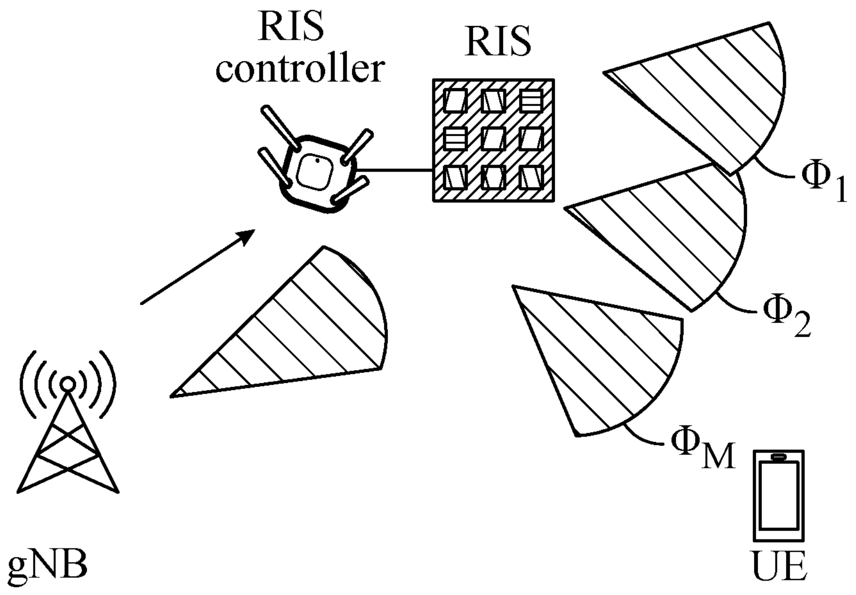
FIG. 5B depicts an example training procedure for a RIS.

Training for a RIS can be performed using reference signals (RSs) such as RS1-RSM as shown in FIG. 5A. In the example illustrated in FIG. 5B, a gnB and/or a UE may train multiple RIS elements of a RIS to determine an optimal RIS configuration (e.g., for directing a signal received from a transmitting device to a receiving device). For example, in downlink (DL) operation, the gNB may send multiple RSs to the RIS. The RIS may then send these RS to the UE. In uplink (UL) operation, the UE may send the multiple RSs to the RIS. The RIS may then send these RSs to the gNB. During this operation, a RIS controller may change weights or coefficient values (e.g., amplitude and phase) across the RIS elements for each RS occasion.

Figure 6:
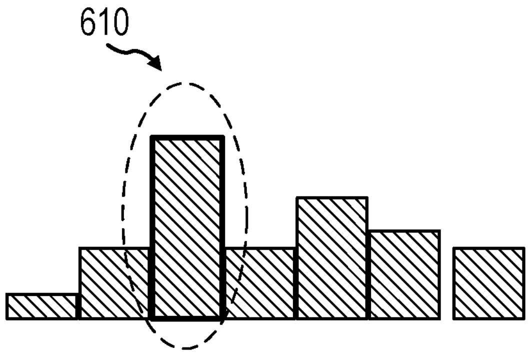
FIG. 6 depicts example selection of a winning beam.

As shown in FIG. 6, a winning beam may be declared as a beam corresponding to a highest receive signal metric (610). For example, a gNB may evaluate different receive beams as part of the training (based on feedback from a UE), such that the end result is also selection of a transmit receive beam pair (e.g., a transmit beam of the UE and receive beam of the gNB). Similar training may be performed with the UE as a transmitter and the gNB as a receiver. In some cases, similar training may be performed with one UE as a transmitter and another UE as a receiver (e.g., a sidelink system).

Aspects Related to Inferring Coefficients of Inactive Reconfigurable Intelligent Surface (RIS) Elements Using Mapping Functions Aspects of the present disclosure provide apparatuses, methods, processing systems, and computer-readable mediums that may help reduce training time for configuring a reconfigurable intelligent surface (RIS). For example, techniques presented herein may be used to train a subset of active RIS elements (instead of all RIS elements in the RIS) and apply results of the training to other RIS elements.

For example, a network entity and a RIS controller may communicate with each other and decide a certain pattern of active RIS elements in a RIS. The active RIS elements may be selected, for example, to provide sufficient distribution among all RIS elements such that coefficients for other RIS elements may be determined (e.g., interpolated or mapped) from coefficients determined for the active RIS elements.

The active RIS elements may be trained to determine optimal coefficient values (e.g., a phase) for those RIS elements. Interpolation, extrapolation, or mapping is then performed to determine coefficient values of remaining RIS elements (e.g., inactive RIS elements) in the RIS based on the determined coefficient values associated with the active RIS elements. In some cases, the active RIS elements (e.g., ON RIS elements) may correspond to RIS elements whose coefficients are determined (e.g., based on some values/parameters and are not inferred), and the inactive RIS elements (e.g., OFF RIS elements) may correspond to RIS elements whose coefficients are determined based on coefficients of active RIS elements. The technique described herein may reduce overall training overhead as only the active RIS elements may be trained (instead of all RIS elements), and the resulting coefficient values may be used to determine coefficients for remaining RIS elements.

Figure 9:
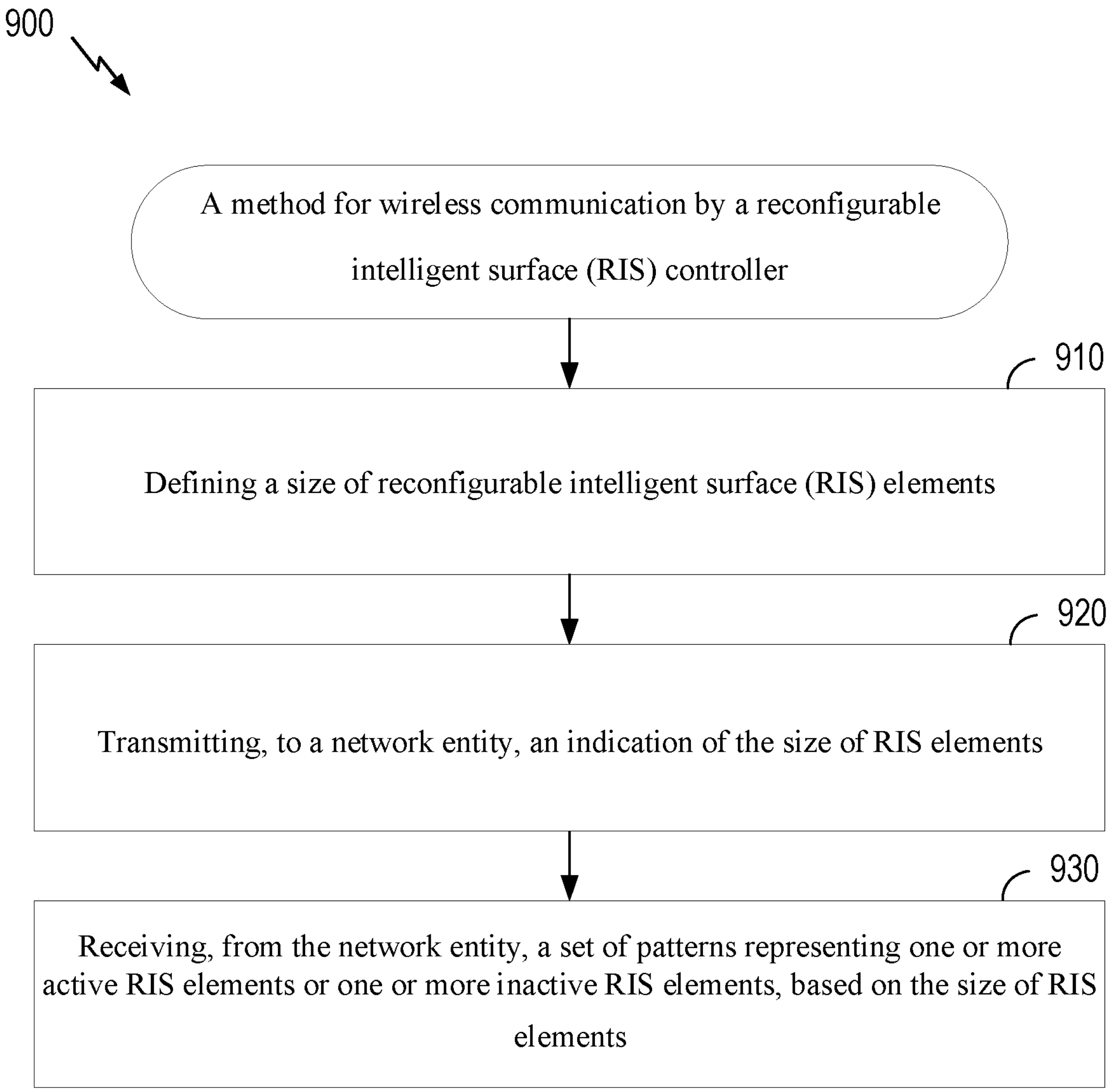
FIG. 9 is a flow diagram illustrating example operations for wireless communication by a RIS controller.

FIGS. 7-9 illustrate example operations that may be performed for training RIS elements, in accordance with aspects of the present disclosure.

FIG. 7 illustrates example operations 700 for wireless communication. The operations 700 may be performed, for example, by a network entity (e.g., such as BS 102 in wireless communication network 100 of FIG. 1). The operations 700 may be implemented as software components that are executed and run on one or more processors (e.g., controller/processor 240 of FIG. 2). Further, transmission and reception of signals by the network entity in operations 700 may be enabled, for example, by one or more antennas (e.g., antennas 234 of FIG. 2). In certain aspects, the transmission and/or reception of signals by the network entity may be implemented via a bus interface of one or more processors (e.g., the controller/processor 240) obtaining and/or outputting signals.

The operations 700 begin, at 710, by defining a size of RIS elements. For example, the network entity may define the size of RIS elements using a processor, antenna(s) and/or transceiver components of BS 102 shown in FIG. 1 or FIG. 2 and/or of the apparatus shown in FIG. 14.

At 720, the network entity defines a set of patterns representing one or more active RIS elements or one or more inactive RIS elements based on the size of RIS elements. For example, the network entity may define the set of patterns representing the one or more active RIS elements or the one or more inactive RIS elements, using a processor, antenna(s) and/or transceiver components of BS 102 shown in FIG. 1 or FIG. 2 and/or of the apparatus shown in FIG. 14.

At 730, the network entity transmits to a RIS controller an indication of the size of RIS elements and the set of patterns. For example, the network entity may transmit the indication of the size of RIS elements and the set of patterns to the RIS controller using antenna(s) and transmitter/transceiver components of BS 102 shown in FIG. 1 or FIG. 2 and/or of the apparatus shown in FIG. 14.

FIG. 8 illustrates example operations 800 for wireless communication to define a bitmap, which is different from a pattern described above. For example, the bitmap represents a size of a number of RIS elements on a surface of a RIS, while the pattern indicates a set of indices of RIS elements that are ON.

The operations 800 may be performed, for example, by a network entity (e.g., such as BS 102 in wireless communication network 100 of FIG. 1). The operations 800 may be implemented as software components that are executed and run on one or more processors (e.g., controller/processor 240 of FIG. 2). Further, transmission and reception of signals by the network entity in operations 800 may be enabled, for example, by one or more antennas (e.g., antennas 234 of FIG. 2). In certain aspects, the transmission and/or reception of signals by the network entity may be implemented via a bus interface of one or more processors (e.g., the controller/processor 240) obtaining and/or outputting signals.

The operations 800 begin, at 810, by defining a set of bitmaps where each bitmap has a size of a number of RIS elements. For example, the network entity may define the set of bitmaps using a processor, antenna(s) and/or transceiver components of BS 102 shown in FIG. 1 or FIG. 2 and/or of the apparatus shown in FIG. 15.

At 820, the network entity transmits to a RIS controller an indication of the set of bitmaps. For example, the network entity may transmit the indication of the set of bitmaps to the RIS controller using antenna(s) and transmitter/transceiver components of BS 102 shown in FIG. 1 or FIG. 2 and/or of the apparatus shown in FIG. 15.

FIG. 9 is a flow diagram illustrating example operations 900 for wireless communication. The operations 900 may be performed, for example, by a RIS controller. The operations 900 may be implemented as software components that are executed and run on one or more processors. Further, transmission and reception of signals by the RIS controller in operations 900 may be enabled, for example, by one or more antennas. In certain aspects, the transmission and/or reception of signals by the RIS controller may be implemented via a bus interface of one or more processors obtaining and/or outputting signals.

The operations 900 begin, at 910, by defining a size of RIS elements. For example, the RIS controller may define the size of RIS elements using a processor of the RIS controller and/or of the apparatus shown in FIG. 16.

At 920, the RIS controller transmits to a network entity an indication of the size of RIS elements. For example, the RIS controller may transmit the indication of the size of RIS elements to the network entity, using antenna(s) and transmitter/transceiver components of the RIS controller and/or of the apparatus shown in FIG. 16.

At 930, the RIS controller receives from the network entity a set of patterns representing one or more active RIS elements and one or more inactive RIS elements based on the size of RIS elements. For example, the RIS controller may receive the set of patterns from the network entity, using antenna(s) and receiver/transceiver components of the RIS controller and/or of the apparatus shown in FIG. 16.

Figure 10B:
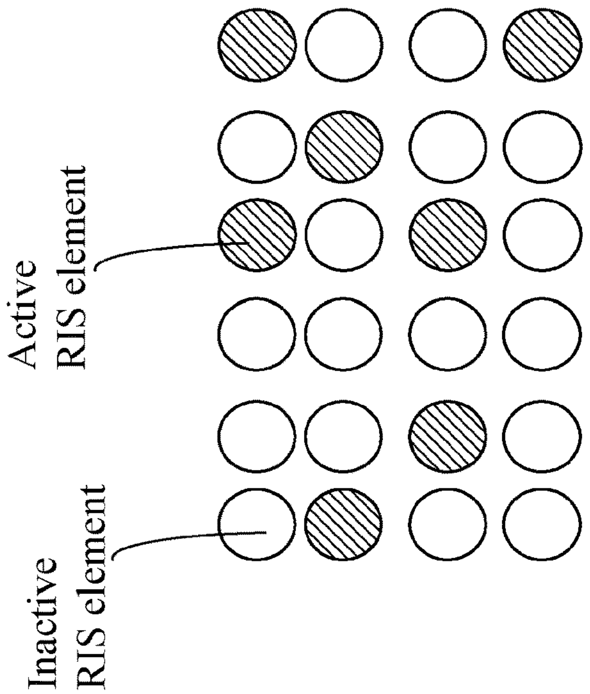
FIG. 10B illustrates another pattern representing active RIS elements and inactive RIS elements.
Figure 10A:
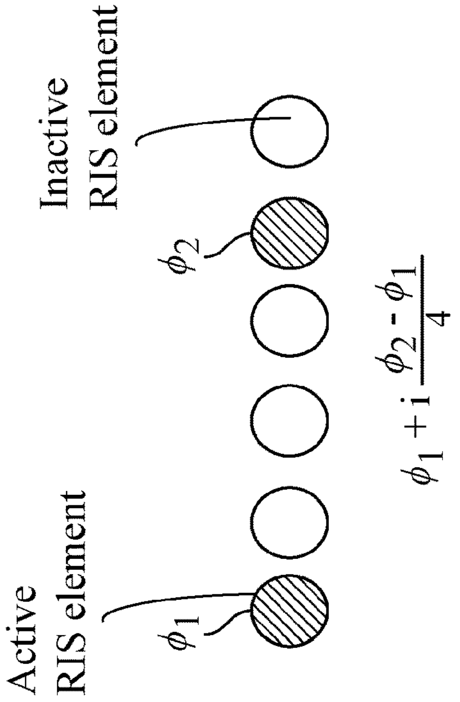
FIG. 10A illustrates a pattern representing active RIS elements and inactive RIS elements.
Figure 11:
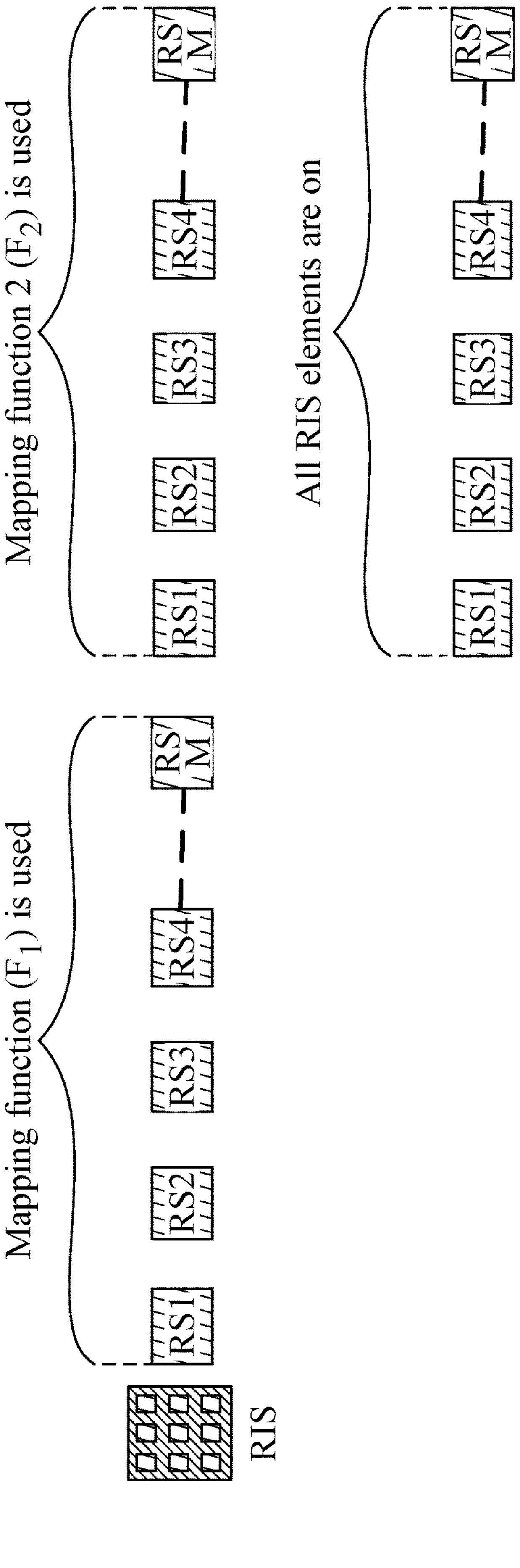
FIG. 11 illustrates example mapping functions for determining coefficients of RIS elements.
Figure 12:
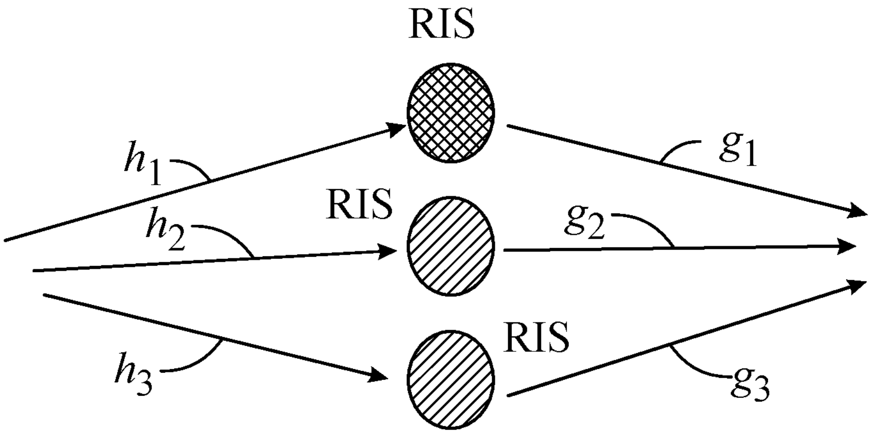
FIG. 12 depicts example channels and proximate RIS elements.

The operations shown in FIGS. 7-9 may be understood with reference to the FIGS. 10-12.

In certain aspects, a network entity transmits an indication of a subset of a set of bitmaps to a RIS controller. In some cases, the network entity may transmit the indication of the subset of the set of bitmaps to the RIS controller via a medium access control (MAC) control element (CE). For example, a set of bitmaps may include a first bitmap (e.g., 1 0 0 1 . . . ), a second bitmap (e.g., 1 0 1 1 . . . ), a third bitmap (e.g., 0 0 1 0 . . . ), a fourth bitmap (e.g., 1 0 1 0 . . . ), a fifth bitmap (e.g., 0 0 0 1 . . . ), a sixth bitmap (e.g., 0 0 1 1 . . . ), a seventh bitmap (e.g., 1 1 1 0 . . . ), and an eighth bitmap (e.g., 0 1 0 0 . . . ). 1 represents active RIS element and 0 represents inactive RIS element. Each bitmap (e.g., two-dimensional bitmap) may have a size corresponding to a number of RIS elements on (surface) of a RIS. In this example, the network entity may indicate to the RIS controller via the MAC-CE to use the first bitmap, the second bitmap, the seventh bitmap, and the eighth bitmap (e.g., four bitmaps out of eight bitmaps initially configured via radio resource control (RRC)).

The network entity transmits an indication of one of the subset of the set of bitmaps (e.g., selected for a predefined duration of time) to the RIS controller. In one aspect, the network entity may transmit the indication of the one of the subset of the set of bitmaps to the RIS controller via a MAC CE. In another aspect, the network entity may transmit the indication of the one of the subset of the set of bitmaps to the RIS controller via a downlink control information (DCI). For example, the network entity may indicate to the RIS controller via the DCI to use a first bitmap out of eight bitmaps (e.g., using two bits in DCI).

In certain aspects, when several bitmaps are configured (e.g., via RRC) and some bitmaps can be later selected by a MAC-CE, it may reduce a number of bits that represent a bitmap in DCI (e.g., to indicate one out of four bitmaps). For example, the network entity may only need two bits instead of log 2 (8) bits (=3 bits) to indicate one out of eight bitmaps defined in RRC.

In certain aspects, a network entity and a RIS controller may decide on a size of a number of RIS elements, and a pattern may then be defined based on the size. In certain aspects, a set of patterns (e.g., for different sets of RIS elements to be ON/active or OFF/inactive) may be defined via a RRC configuration. In certain aspects, a pattern may indicate a set of indices of RIS elements that are active. In one example, when there are 10 RIS elements, one pattern may indicate RIS elements (1 5 8 10) to be active and another pattern may indicate RIS elements (2 4 6 9 10) to be active.

FIG. 10A illustrates an example with 6 RIS elements, where two RIS elements are active and four RIS elements are inactive. As illustrated in FIG. 10B, again assuming 6 RIS elements, 4 different patterns may be defined (e.g., and configured via RRC). One of the 4 patterns may be selected using 2 bits.

In certain aspects, a network entity transmits an indication of a subset of the set of patterns to a RIS controller. For example, the network entity may transmit the indication to the RIS controller via a MAC CE.

In certain aspects, a network entity transmits an indication of one of the subset of the set of patterns (e.g., selected for a predefined duration of time) to a RIS controller. In one example, the network entity may transmit the indication to the RIS controller via a MAC-CE. In another example, the network entity may transmit the indication to the RIS controller via a DCI. In certain aspects, a network entity may train surface configuration of RIS elements during the predefined duration of time (e.g., this predefined duration of time includes training of RIS surface configuration and learning a mapping function).

In certain aspects, a coefficient value of one or more active RIS elements is determined based on training of the one or more active RIS elements. In one example, the coefficient value is a phase value. In another example, the coefficient value is an amplitude value. In another example, the coefficient value is a magnitude value. In another example, the coefficient value is a scale value (e.g., represented a scaled version of a reference value). In certain aspects, a coefficient value of one or more inactive RIS elements is determined using a function. The function may be based at least on the coefficient value of the one or more active RIS elements.

In certain aspects, a RIS controller may only actively change phases of certain (M number of) RIS elements using a codebook or randomly (e.g., with certain pattern of these RIS elements known at both network entity/UE). In some cases, these RIS elements may be selected based on some channel measurements (e.g., same input/output channels). In some cases, a network entity may indicate a pattern of these RIS elements to the RIS controller.

In certain aspects, a deterministic set of (linear or non-linear) functions may be implemented to determine a coefficient value associated with inactive RIS elements (based on coefficient values associated with active RIS elements). In one example, the deterministic set of functions may be predefined. In another example, the deterministic set of functions may be received or indicated via signaling (e.g., from network entity).

In certain aspects, once active RIS elements of a RIS are trained (and coefficients/phase values of the active RIS elements are determined), a function (e.g., F) may be implemented to determine phases of inactive or turned off RIS elements of the RIS.

For example, as illustrated in FIG. 10A, once phase values of active RIS elements (e.g., a first RIS element and a fourth RIS element) are determined based on a training of the active RIS elements, a phase of remaining RIS elements may be determined using Equation 1:

$$\phi_1 + i\frac{\phi_2 - \phi_1}{4}$$

where i={0,1,2,3,4}. In this case, i=0 represents a phase of a first RIS element and i=4 represents a phase of a fifth RIS element. In this manner, the phase values associated with the inactive RIS elements may be determined based on the phase values of the active RIS elements.

In some cases, when a coefficient (e.g., associated with one or more active RIS elements) is a complex parameter, then an interpolation (e.g., to determine a coefficient of remaining RIS elements) may become a phase interpolation (where an equation similar to the Equation 1 is used on a phase parameter) and/or an amplitude interpolation (where an equation for an amplitude parameter is used, which is similar to the Equation 1).

For example, a first RIS element may have a first coefficient $\beta_1 \exp(-j\phi_1)$ (where $j=\sqrt{-1}$) and a second RIS element may have a second coefficient $\beta_2 \exp(-j\phi_2)$. In this example, a phase interpolation may be performed using the above-noted Equation 1, and an amplitude interpolation may be performed using Equation 2:

$$\beta_1 + i\frac{\beta_2 - \beta_1}{4}$$

In some cases, another interpolation technique (which is different from a phase interpolation technique or an amplitude interpolation technique) may be implemented. For example, per this technique, an entire coefficient may obtained through interpolation using Equation 3:

$$\beta_1 \exp(-j\phi_1) + i\frac{\beta_2 \exp(-j\phi_2) - \beta_1 \exp(-j\phi_1)}{4}$$

In some cases, when there may be no third RIS element within a same row on a surface of a RIS (e.g., for points outside of two RIS elements of the RIS), an extrapolation technique may be implemented (e.g., when interpolation/extrapolation technique is used) to determine a coefficient of remaining RIS elements. In some cases, a mapping function (F) may be implemented. In one example, the mapping function may be a linear function. In another example, the mapping function may be a polynomial function. In another example, the mapping function may be a generic function.

As noted above, a network entity transmits one or more reference signals (RSs) to a RIS controller to train RIS elements (e.g., as part of beam training). The RIS elements may be active RIS elements. In certain aspects, a plurality of functions may be implemented to train the RIS elements using the one or more RSs. Upon the completion of the training process, the network entity may select one of the plurality of functions. In one example, the network entity may select one of the plurality of functions based on a reference signal received power (RSRP) determined during the training of the RIS elements using the plurality of functions. In another example, the network entity may select one of the plurality of functions based on a reference signal received quality (RSRQ) determined during the training of the RIS elements using the plurality of functions. In another example, the network entity may select one of the plurality of functions based on a signal to noise and interference ratio (SINR) determined during the training of the RIS elements using the plurality of functions. In another example, the network entity may select one of the plurality of functions based on the RSRP, RSRQ, and/or SINR.

For example, during training operation of RIS elements, a network entity may transmit L*M*J RSs to the RIS elements. L may represent a number of functions, while J represents a number of channel realizations. M represents a number of RSs.

As illustrated in FIG. 11, the functions may be mapping functions such as a first mapping function F1 and a second mapping function F2. For each M RSs, a function may be used along with a full training of M occasions. A RIS controller may then implement L different functions. This training process may last for J different channel realizations. After the training is over, based on a best metric (e.g., RSRP/RSRQ/SINR), the RIS controller and/or the network entity may determine a best function. In some cases, the determined function may be used to determine coefficient values of inactive RIS elements.

In certain aspects, a function (e.g., a static function) may be determined and parametrized based on a channel type. In certain aspects, a function may be determined and parametrized based on a channel average delay. In certain aspects, a function may be determined and parametrized based on a delay spread. In certain aspects, a function may be determined and parametrized based on a Doppler spread. In certain aspects, a function may be determined and parametrized based on a Doppler shift.

In certain aspects, a network entity (or a UE) may determine one or more channel parameters. The network entity (or the UE) may then transmit the one or more channel parameters to a RIS controller. Based on these one or more channel parameters, the RIS controller may select a function.

In certain aspects, a technique is implemented to determine an optimal beam for a RIS containing multiple RIS elements. An example of such a technique may be described as a series of steps, as follows.

In a first step, a RIS controller may select a codebook beamformer from a codebook matrix (or generate random coefficients in case of non-codebook based matrix). For example, the RIS controller may select a vector from the codebook matrix. In a second step, the RIS controller may use coefficient values in the vector on a RIS element (e.g., kth element in a beamforming vector is used on kth RIS element). In a third step, a UE may measure a metric (e.g., RSRP/RSRQ/SINR) based on M number of RS occasions. In a fourth step, based on a pattern/bitmap and using a mapping function, the RIS controller may determine coefficient values to be used on (to-be-turned-off) RIS elements. The RIS controller may further start to determine an optimal function by training a receiving side (e.g., a network entity/a UE) during M number of RS occasions. In a fifth step, the UE (e.g., at the receiver side) may measure the metric based on the M number of RS occasions. In a sixth step, the fourth step is repeated as many times as there are mapping functions (e.g., predefined configured functions). In an eight step, minimum mean square error (MMSE) (across M and J training occasions) or some other metric is used to determine a closest mapping function to an actual channel (e.g., the MMSE between the best beam and whatever obtained by mapping functions). J represents a number of channel fading realizations. This determined mapping function may be used until a next time when the mapping function is required to be changed (e.g., due to a trigger from gNB/a UE/a primary UE/a controlling UE).

In certain aspects, when channel coefficients of some RIS elements are the same, a RIS controller may set a phase to be equal across two or more RIS elements without much loss of a performance. For example, as illustrated in FIG. 12, when three RIS elements are relatively close to each other, these RIS elements may experience the same or similar channels (e.g., all $h_i$=h and all $g_i$=g, where h and g are different channels). Also, when all $h_i$=h and all $g_i$=g, $hg\Sigma\alpha_i$. In such cases, there may be phase optimization, which may be maximized when the phase across all RIS elements ($\alpha_i=\alpha$) is equal and set to align with phases of h, g.

This channel correlation and leverage information may be used to reduce a number of RIS elements whose coefficient values have to be actively changed (e.g., during training of RIS elements). For example, when there is a coherence space (e.g., a number of RIS elements that have same input/output channels is M), a RIS controller may turn off M−1 RIS elements and leave one of the M RIS elements ON. A network entity may then train (e.g., by sending a set of RSs) this single RIS element, so that weight or phase is optimized. The weight may then be used across remaining RIS elements that were turned OFF. Such a process allows the network entity, the RIS controller, and/or a UE to train (e.g., through the RSS) N/M RIS elements instead of N RIS elements where N represents a number of RIS elements.

In certain aspects, an application of a mapping function may be on different RIS elements. For example, the application of a mapping function may be on a pair of RIS elements coefficients in a same row. In another example, the application of a mapping function may be on a pair of RIS elements coefficients in a same column. In another example, the application of a mapping function may be on a pair of RIS elements coefficients arranged in a diagonal manner.

Figure 13:
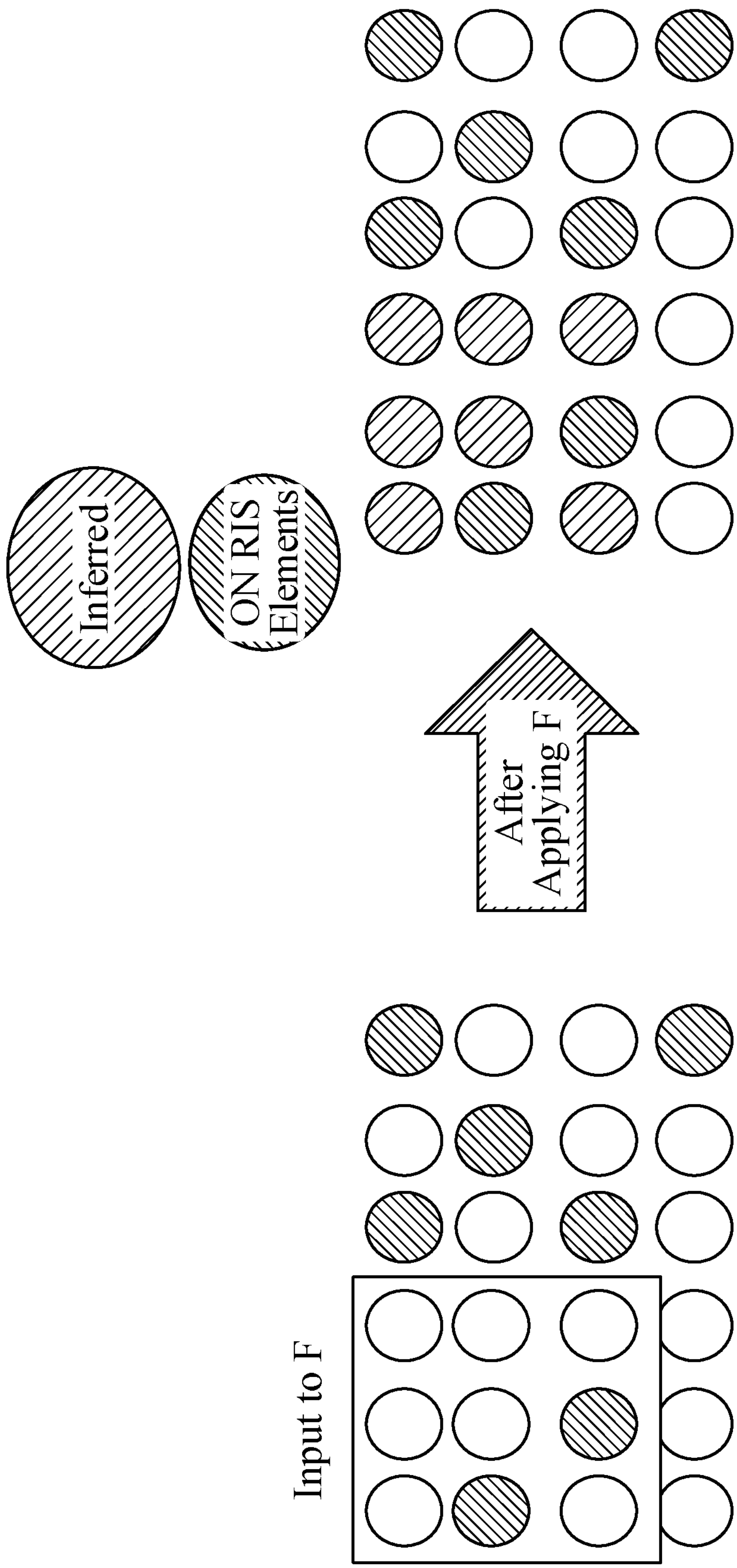
FIG. 13 depicts example application of a mapping function.

In certain aspects, an application of a mapping function may be on a set or cluster of RIS elements coefficients. For example, as illustrated in FIG. 13, F function may take coefficients of RIS elements within a square shape on a RIS surface. In another example, the F function may take coefficients of RIS elements within a rectangular shape on a RIS surface and then use it for every L1XL2 RIS elements (e.g., 2X3=6 RIS elements where 2 rows and 3 columns of RIS elements coefficients are taken as an input to the F function where there may by only 2 or 3 RIS elements that are active/ON while other RIS elements are turned off. The function output may be the entire cluster of RIS coefficients). In certain aspects, an application of a mapping function may be on all RIS elements coefficients (and obtain all remaining coefficients).

In certain aspects, RIS elements are considered active/ON only during training of a RIS; after we get an optimal mapping function. During a process to obtain the optimal mapping function, codebook elements may be used on RIS elements that will be active (e.g., the RIS elements trained by a codebook and not inferred RIS coefficients). The mapping function may be used to obtain coefficients on remaining RIS elements of the RIS (and all RIS elements may be active during this time).

In certain aspects, even during training of a RIS to obtain optimal coefficients (e.g., after obtaining a mapping function), the RIS may enable/activate (or turn ON) all RIS elements. For example, a set of RIS elements' coefficients may be trained/modified by a codebook or non-codebook beamformer/vector columns, and coefficients of another set of RIS elements may be inferred using a (mapping) F function. The F function may be obtained from a mapping function learning/training procedure. In such cases, ON/activate mainly refers to the fact that those RIS elements' coefficients are obtained from the codebook or non-codebook (or a set of values), while OFF/inactive may refer to RIS elements whose coefficients may be obtained/determined as a function from the activated RIS elements' coefficients.

Example Wireless Communication Devices

Figure 14:
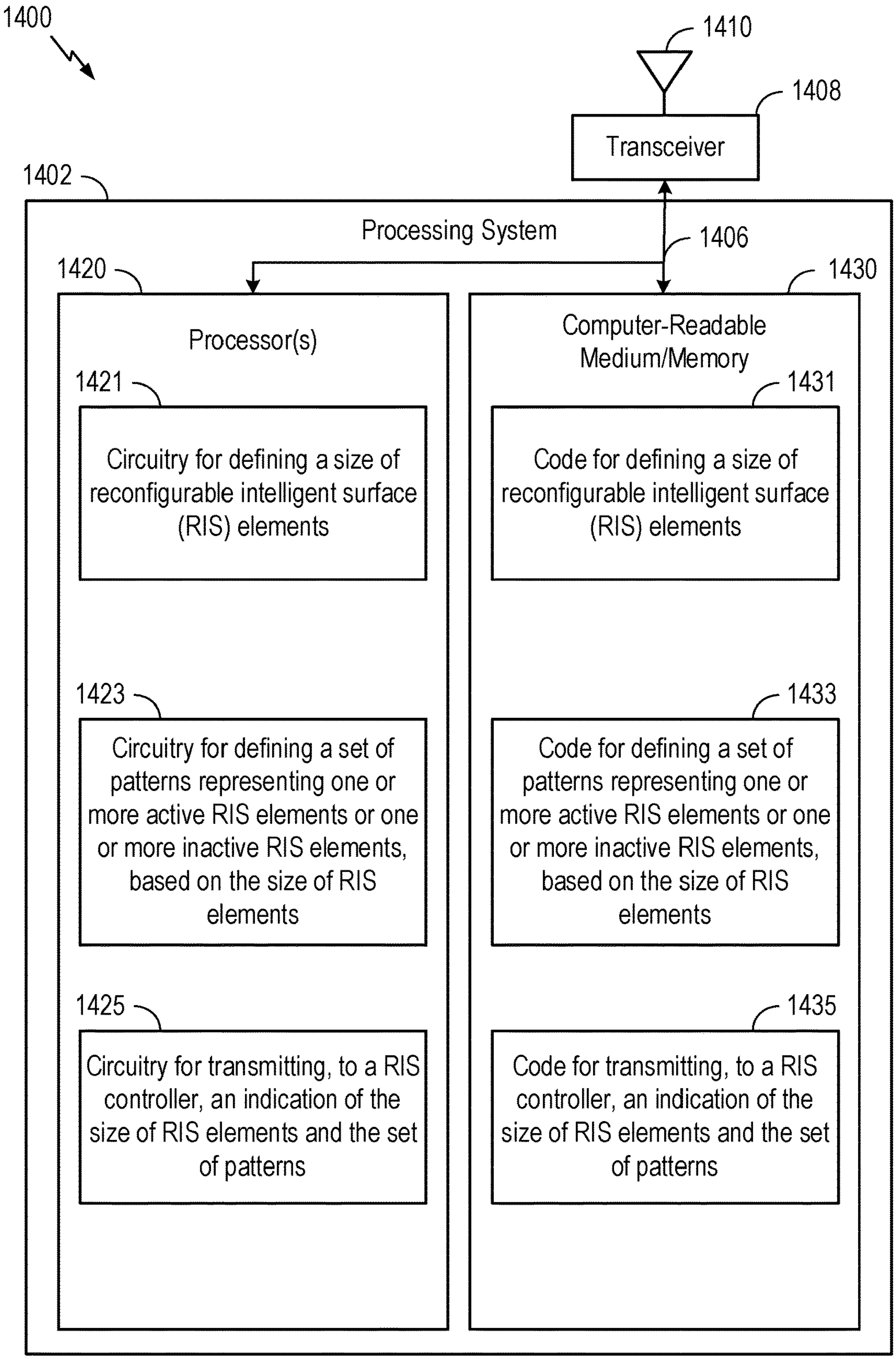
FIG. 14 depicts an example communications device.

FIG. 14 depicts an example communications device 1400 that includes various components operable, configured, or adapted to perform operations for the techniques disclosed herein, such as the operations depicted and described with respect to FIG. 7. In some examples, communication device 1400 may be a BS 102 as described, for example with respect to FIGS. 1 and 2.

Communications device 1400 includes a processing system 1402 coupled to a transceiver 1408 (e.g., a transmitter and/or a receiver). Transceiver 1408 is configured to transmit (or send) and receive signals for the communications device 1400 via an antenna 1410, such as the various signals as described herein. Processing system 1402 may be configured to perform processing functions for communications device 1400, including processing signals received and/or to be transmitted by communications device 1400.

Processing system 1402 includes one or more processors 1420 coupled to a computer-readable medium/memory 1430 via a bus 1406. In certain aspects, computer-readable medium/memory 1430 is configured to store instructions (e.g., computer-executable code) that when executed by the one or more processors 1420, cause the one or more processors 1420 to perform the operations illustrated in FIG. 7, or other operations for performing the various techniques discussed herein.

In the depicted example, computer-readable medium/memory 1430 stores code 1431 for defining a size of RIS elements, code 1433 for defining a set of patterns representing one or more active RIS elements or one or more inactive RIS elements based on the size of RIS elements, and code 1435 for transmitting to a RIS controller an indication of the size of RIS elements and the set of patterns.

In the depicted example, the one or more processors 1420 include circuitry configured to implement the code stored in the computer-readable medium/memory 1430, including circuitry 1421 for defining a size of RIS elements, circuitry 1423 for defining a set of patterns representing one or more active RIS elements or one or more inactive RIS elements based on the size of RIS elements, and circuitry 1425 for transmitting to a RIS controller an indication of the size of RIS elements and the set of patterns.

Various components of communications device 1400 may provide means for performing the methods described herein, including with respect to FIG. 7.

In some examples, means for transmitting or sending (or means for outputting for transmission) may include the transceivers 232 and/or antenna(s) 234 of the BS 102 illustrated in FIG. 2 and/or transceiver 1408 and antenna 1410 of the communication device 1400 in FIG. 14.

In some examples, means for receiving (or means for obtaining) may include the transceivers 232 and/or antenna(s) 234 of the BS illustrated in FIG. 2 and/or transceiver 1408 and antenna 1410 of the communication device 1400 in FIG. 14.

In some cases, rather than actually transmitting, for example, signals and/or data, a device may have an interface to output signals and/or data for transmission (a means for outputting). For example, a processor may output signals and/or data, via a bus interface, to a radio frequency (RF) front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive multiple input multiple output (MIMO) processors, modulators, demodulators, and the like, such as depicted in the examples in FIG. 2.

In some examples, means for defining a size of RIS elements, means for defining a set of patterns representing one or more active RIS elements or one or more inactive RIS elements based on the size of RIS elements, means for transmitting to a RIS controller an indication of the size of RIS elements and the set of patterns, may include various processing system components, such as: the one or more processors 1420 in FIG. 14, or aspects of the BS 102 depicted in FIG. 2, including receive processor 238, transmit processor 220, TX MIMO processor 230, and/or controller/processor 240 (including RIS component 241).

Notably, FIG. 14 is an example, and many other examples and configurations of communication device 1400 are possible.

Figure 15:
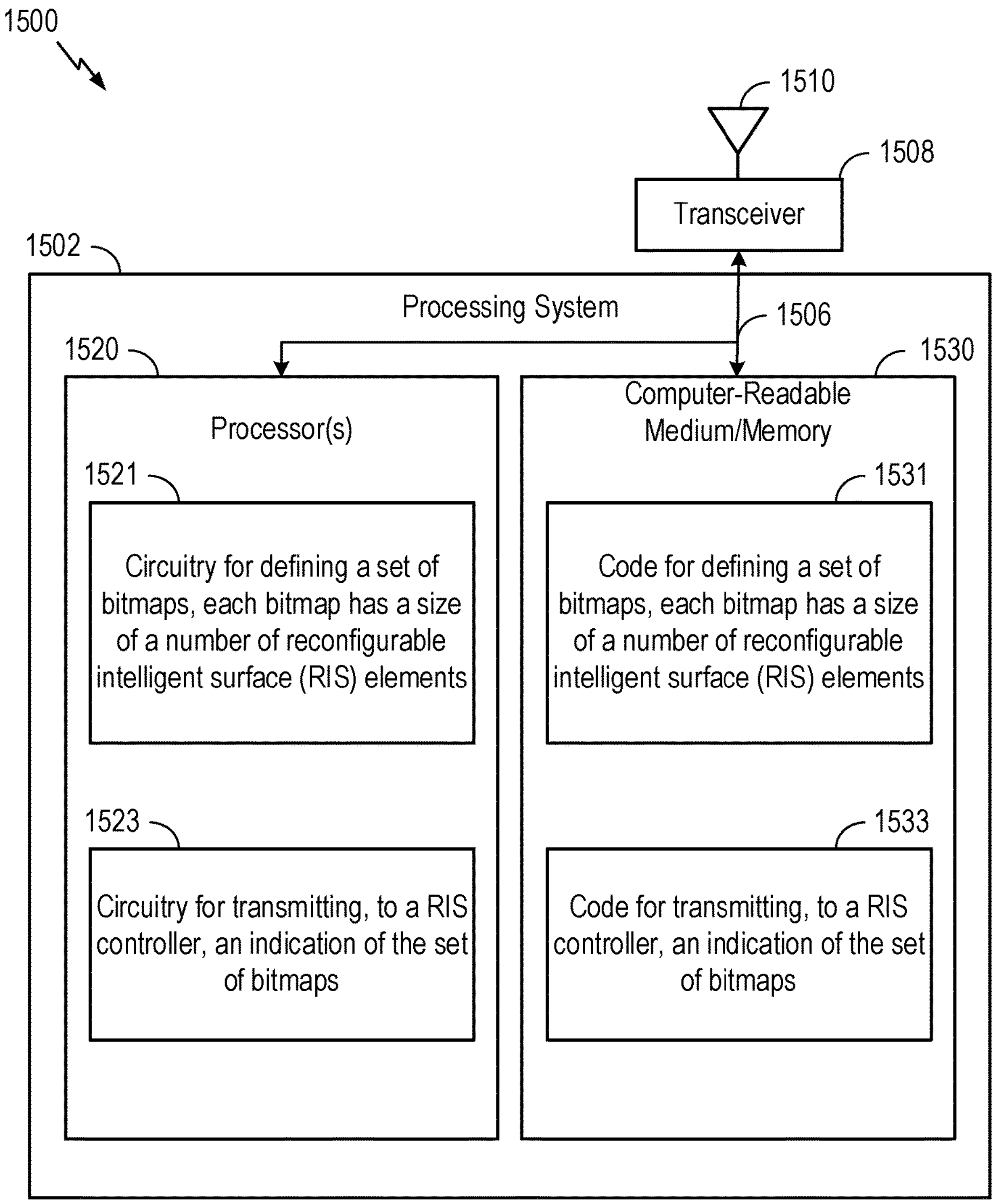
FIG. 15 depicts an example communications device.

FIG. 15 depicts an example communications device 1500 that includes various components operable, configured, or adapted to perform operations for the techniques disclosed herein, such as the operations depicted and described with respect to FIG. 8. In some examples, communication device 1500 may be a BS 102 as described, for example with respect to FIGS. 1 and 2.

Communications device 1500 includes a processing system 1502 coupled to a transceiver 1508 (e.g., a transmitter and/or a receiver). Transceiver 1508 is configured to transmit (or send) and receive signals for the communications device 1500 via an antenna 1510, such as the various signals as described herein. Processing system 1502 may be configured to perform processing functions for communications device 1500, including processing signals received and/or to be transmitted by communications device 1500.

Processing system 1502 includes one or more processors 1520 coupled to a computer-readable medium/memory 1530 via a bus 1506. In certain aspects, computer-readable medium/memory 1530 is configured to store instructions (e.g., computer-executable code) that when executed by the one or more processors 1520, cause the one or more processors 1520 to perform the operations illustrated in FIG. 8, or other operations for performing the various techniques discussed herein.

In the depicted example, computer-readable medium/memory 1530 stores code 1531 for defining a set of bitmaps where each bitmap has a size of a number of RIS elements and code 1533 for transmitting to a RIS controller an indication of the set of bitmaps.

In the depicted example, the one or more processors 1520 include circuitry configured to implement the code stored in the computer-readable medium/memory 1530, including circuitry 1521 for defining a set of bitmaps where each bitmap has a size of a number of RIS elements and circuitry 1523 for transmitting to a RIS controller an indication of the set of bitmaps.

Various components of communications device 1500 may provide means for performing the methods described herein, including with respect to FIG. 8.

In some examples, means for transmitting or sending (or means for outputting for transmission) may include the transceivers 232 and/or antenna(s) 234 of the BS 102 illustrated in FIG. 2 and/or transceiver 1508 and antenna 1510 of the communication device 1500 in FIG. 15.

In some examples, means for receiving (or means for obtaining) may include the transceivers 232 and/or antenna(s) 234 of the BS illustrated in FIG. 2 and/or transceiver 1508 and antenna 1510 of the communication device 1500 in FIG. 15.

In some cases, rather than actually transmitting, for example, signals and/or data, a device may have an interface to output signals and/or data for transmission (a means for outputting). For example, a processor may output signals and/or data, via a bus interface, to a RF front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

In some examples, means for defining a set of bitmaps where each bitmap has a size of a number of RIS elements and means for transmitting to a RIS controller an indication of the set of bitmaps, may include various processing system components, such as: the one or more processors 1520 in FIG. 15, or aspects of the BS 102 depicted in FIG. 2, including receive processor 238, transmit processor 220, TX MIMO processor 230, and/or controller/processor 240 (including RIS component 241).

Notably, FIG. 15 is an example, and many other examples and configurations of communication device 1500 are possible.

Figure 16:
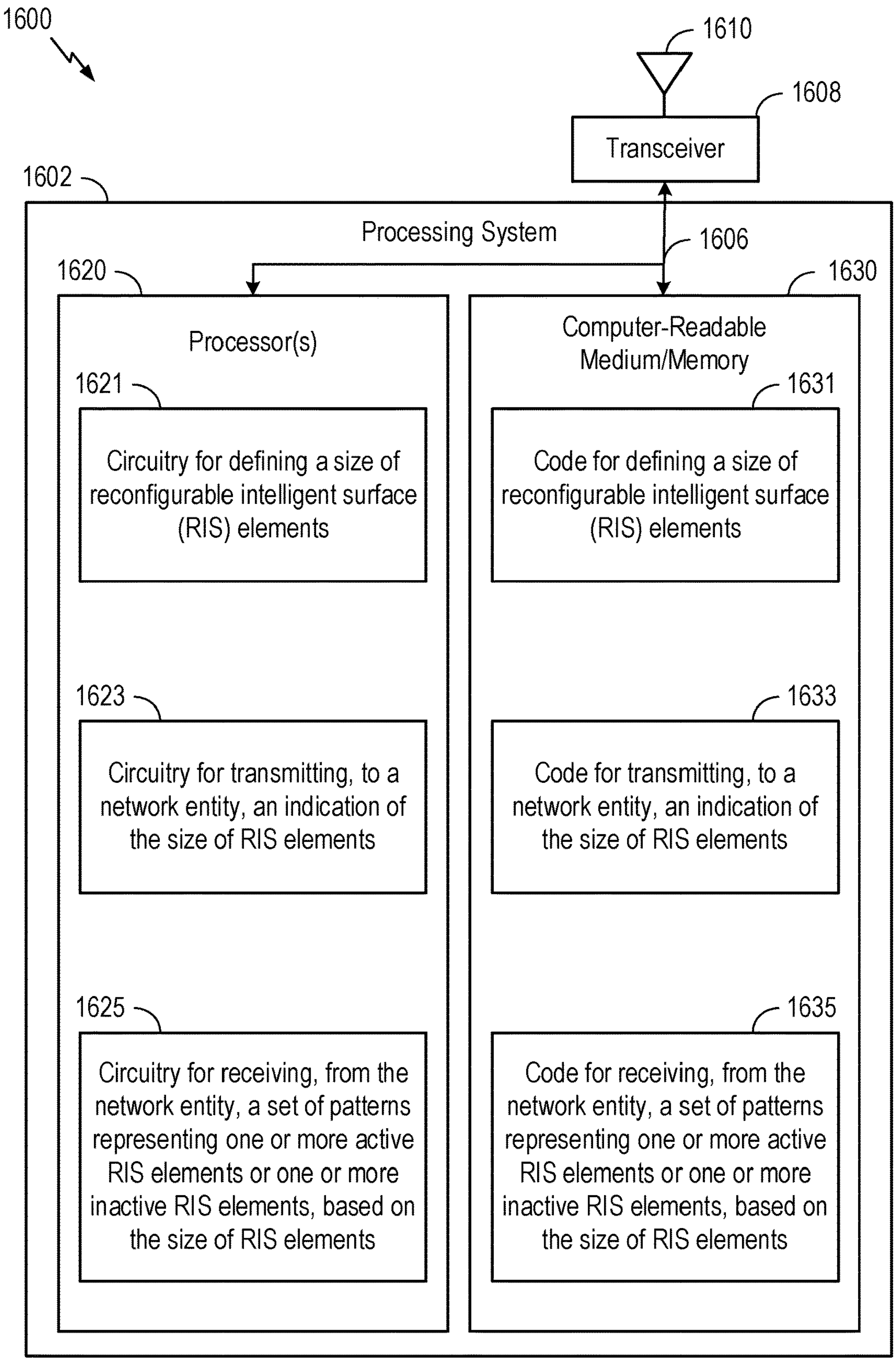
FIG. 16 depicts an example communications device.

FIG. 16 depicts an example communications device 1600 that includes various components operable, configured, or adapted to perform operations for the techniques disclosed herein, such as the operations depicted and described with respect to FIG. 9.

Communications device 1600 includes a processing system 1602 coupled to a transceiver 1608 (e.g., a transmitter and/or a receiver). Transceiver 1608 is configured to transmit (or send) and receive signals for the communications device 1600 via an antenna 1610, such as the various signals as described herein. Processing system 1602 may be configured to perform processing functions for communications device 1600, including processing signals received and/or to be transmitted by communications device 1600.

Processing system 1602 includes one or more processors 1620 coupled to a computer-readable medium/memory 1630 via a bus 1606. In certain aspects, computer-readable medium/memory 1630 is configured to store instructions (e.g., computer-executable code) that when executed by the one or more processors 1620, cause the one or more processors 1620 to perform the operations illustrated in FIG. 9, or other operations for performing the various techniques discussed herein.

In the depicted example, computer-readable medium/memory 1630 stores code 1631 for defining a size of RIS elements, code 1633 for transmitting to a network entity an indication of the size of RIS elements, and code 1635 for receiving from the network entity a set of patterns representing one or more active RIS elements or one or more inactive RIS elements based on the size of RIS elements.

In the depicted example, the one or more processors 1620 include circuitry configured to implement the code stored in the computer-readable medium/memory 1630, including circuitry 1621 for defining a size of RIS elements, circuitry 1623 for transmitting to a network entity an indication of the size of RIS elements, and circuitry 1625 for receiving from the network entity a set of patterns representing one or more active RIS elements or one or more inactive RIS elements based on the size of RIS elements.

Various components of communications device 1600 may provide means for performing the methods described herein, including with respect to FIG. 9.

In some examples, means for defining a size of RIS elements, means for transmitting to a network entity an indication of the size of RIS elements, and means for receiving from the network entity a set of patterns representing one or more active RIS elements or one or more inactive RIS elements based on the size of RIS elements, may include various processing system components, such as: the one or more processors 1620 in FIG. 16.

Notably, FIG. 16 is an example, and many other examples and configurations of communication device 1600 are possible.

EXAMPLE CLAUSES

Implementation examples are described in the following numbered clauses:

Clause 1: A method for wireless communication by a network entity, comprising: defining a size of reconfigurable intelligent surface (RIS) elements; defining a set of patterns representing one or more active RIS elements or one or more inactive RIS elements, based on the size of RIS elements; and transmitting, to a RIS controller, an indication of the size of RIS elements and the set of patterns.

Clause 2: The method alone or in combination with the first clause, wherein the set of patterns are defined via a radio resource control (RRC) configuration.

Clause 3: The method alone or in combination with one or more of the first and second clauses, transmitting, to the RIS controller, via a medium access control (MAC) control element (CE), an indication of a subset of the set of patterns.

Clause 4: The method alone or in combination with one or more of the first through third clauses, transmitting, to the RIS controller via at least one of a downlink control information (DCI) or a medium access control (MAC) control element (CE), an indication of one of the subset of the set of patterns selected for a predefined duration of time.

Clause 5: The method alone or in combination with one or more of the first through fourth clauses, training surface configuration of the RIS elements during the predefined duration of time.

Clause 6: The method alone or in combination with one or more of the first through fifth clauses, wherein a coefficient value of the one or more inactive RIS elements is determined using a function, and wherein the function is based at least on a coefficient value of the one or more active RIS elements.

Clause 7: The method alone or in combination with one or more of the first through sixth clauses, wherein the coefficient value is at least one of: a phase value, an amplitude value, a magnitude value, or a scale value.

Clause 8: The method alone or in combination with one or more of the first through seventh clauses, transmitting, to the RIS controller, one or more reference signals (RSs) to train the RIS elements, wherein a plurality of functions are implemented to train the RIS elements using the one or more RSs; and selecting one of the plurality of functions, based on one or more of a reference signal received power (RSRP), a reference signal received quality (RSRQ), and a signal to noise and interference ratio (SINR), determined during the training of the RIS elements using the plurality of functions.

Clause 9: The method alone or in combination with one or more of the first through eighth clauses, wherein a coefficient value of the one or more inactive RIS elements is determined using the selected function.

Clause 10: The method alone or in combination with one or more of the first through ninth clauses, wherein a function is determined and parametrized based on one or more of: a channel type, a channel average delay, a delay spread, a Doppler spread, and a Doppler shift.

Clause 11: The method alone or in combination with one or more of the first through tenth clauses, wherein a coefficient value of the one or more inactive RIS elements is determined using the parametrized function.

Clause 12: The method alone or in combination with one or more of the first through eleventh clauses, determining one or more channel parameters; and transmitting, to the RIS controller, the one or more channel parameters.

Clause 14: A method for wireless communication by a network entity, comprising: defining a set of bitmaps, each bitmap has a size of a number of reconfigurable intelligent surface (RIS) elements; and transmitting, to a RIS controller, an indication of the set of bitmaps.

Clause 14: The method alone or in combination with the thirteenth clause, transmitting, to the RIS controller, via a medium access control (MAC) control element (CE), an indication of a subset of the set of bitmaps.

Clause 15: The method alone or in combination with one or more of the thirteenth and fourteenth clauses, transmitting, to the RIS controller via at least one of a downlink control information (DCI) or a medium access control (MAC) control element (CE), an indication of one of the subset of the set of bitmaps selected for a predefined duration of time.

Clause 16: A method for wireless communication by a reconfigurable intelligent surface (RIS) controller, comprising: defining a size of reconfigurable intelligent surface (RIS) elements; transmitting, to a network entity, an indication of the size of RIS elements; and receiving, from the network entity, a set of patterns representing one or more active RIS elements or one or more inactive RIS elements, based on the size of RIS elements.

Clause 17: The method alone or in combination with the sixteenth clause, receiving, from the network entity, via a medium access control (MAC) control element (CE), an indication of a subset of the set of patterns.

Clause 18: The method alone or in combination with one or more of the sixteenth and seventeenth clauses, receiving, from the network entity, via at least one of a downlink control information (DCI) or a medium access control (MAC) control element (CE), an indication of one of the subset of the set of patterns selected for a predefined duration of time.

Clause 19: The method alone or in combination with one or more of the sixteenth through eighteenth clauses, wherein a coefficient value of the one or more inactive RIS elements is determined using a function, and wherein the function is based at least on a coefficient value of the one or more active RIS elements.

Clause 20: The method alone or in combination with one or more of the sixteenth through nineteenth clauses, wherein the coefficient value is at least one of: a phase value, an amplitude value, a magnitude value, or a scale value.

Clause 21: An apparatus, comprising: a memory comprising executable instructions; one or more processors configured to execute the executable instructions and cause the apparatus to perform a method in accordance with any one of Clauses 1-20.

Clause 22: An apparatus, comprising means for performing a method in accordance with any one of Clauses 1-20.

Clause 23: A non-transitory computer-readable medium comprising executable instructions that, when executed by one or more processors of an apparatus, cause the apparatus to perform a method in accordance with any one of Clauses 1-20.

Clause 24: A computer program product embodied on a computer-readable storage medium comprising code for performing a method in accordance with any one of Clauses 1-20.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

BSs 102 configured for 4G LTE (collectively referred to as Evolved Universal Mobile Telecommunications System (UMTS) Terrestrial Radio Access Network (E-UTRAN)) may interface with the EPC 160 through first backhaul links 142 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through EPC 160 or 5GC 190) with each other over third backhaul links 144 (e.g., X2 interface). Third backhaul links 144 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some BSs, such as BS 180 may operate in a traditional sub-6 GHz spectrum, in millimeter wave (mmWave) frequencies, and/or near mmWave frequencies in communication with the UE 104. When BS 180 operates in mm Wave or near mm Wave frequencies, the BS 180 may be referred to as an mmWave BS.

The communication links 120 between BSs 102 and, for example, UEs 104, may be through one or more carriers. For example, BSs 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications network 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to 24×15 kHz, where u is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 3A-3D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at BS. UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by BS for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

ADDITIONAL CONSIDERATIONS

The preceding description provides examples of managing reconfigurable intelligent surface (RIS) elements in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (UE) (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. An apparatus for wireless communication by a network entity, comprising:
- at least one processor and a memory configured to:
  - define a size of reconfigurable intelligent surface (RIS) elements;
  - define a set of patterns, via a radio resource control (RRC) configuration, representing one or more active RIS elements or one or more inactive RIS elements, based on the size of the RIS elements;
  - transmit, to a RIS controller, an indication of the size of the RIS elements and the set of patterns; and
  - transmit, to the RIS controller, via a medium access control (MAC) control element (CE), an indication of a subset of the set of patterns.

2. The apparatus of claim 1, wherein the at least one processor is further configured to: transmit, to the RIS controller via at least one of a downlink control information (DCI) or a medium access control (MAC) control element (CE), an indication of one of the subset of the set of patterns selected for a predefined duration of time.

3. The apparatus of claim 2, wherein the at least one processor is further configured to: train surface configuration of the RIS elements during the predefined duration of time.

4. The apparatus of claim 1, wherein a coefficient value of the one or more inactive RIS elements is determined using a function, and wherein the function is based at least on a coefficient value of the one or more active RIS elements.

5. The apparatus of claim 4, wherein the coefficient value is at least one of: a phase value, an amplitude value, a magnitude value, or a scale value.

6. The apparatus of claim 1, wherein the at least one processor is further configured to:
- transmit, to the RIS controller, one or more reference signals (RSS) to train the RIS elements, wherein a plurality of functions are implemented to train the RIS elements using the one or more RSs; and
- select one of the plurality of functions, based on one or more of a reference signal received power (RSRP), a reference signal received quality (RSRQ), and a signal to noise and interference ratio (SINR), determined during the training of the RIS elements using the plurality of functions.

7. The apparatus of claim 6, wherein a coefficient value of the one or more inactive RIS elements is determined using a selected function.

8. The apparatus of claim 1, wherein a function is determined and parametrized based on one or more of: a channel type, a channel average delay, a delay spread, a Doppler spread, and a Doppler shift.

9. The apparatus of claim 8, wherein a coefficient value of the one or more inactive RIS elements is determined using a parametrized function.

10. The apparatus of claim 1, wherein the at least one processor is further configured to:
- determine one or more channel parameters; and
- transmit, to the RIS controller, the one or more channel parameters.

11. An apparatus for wireless communication by a network entity, comprising:
- at least one processor and a memory configured to:
- define a set of bitmaps, each bitmap has a size of a number of reconfigurable intelligent surface (RIS) elements; and
- transmit, to a RIS controller, an indication of the set of bitmaps; and
- transmit, to the RIS controller, via a medium access control (MAC) control element (CE), an indication of a subset of the set of bitmaps.

12. The apparatus of claim 11, wherein the at least one processor is further configured to: transmit, to the RIS controller via at least one of a downlink control information (DCI) or a medium access control (MAC) control element (CE), an indication of one of the subset of the set of bitmaps selected for a predefined duration of time.

13. An apparatus for wireless communication by a reconfigurable intelligent surface (RIS) controller, comprising:
at least one processor and a memory configured to:
define a size of reconfigurable intelligent surface (RIS) elements;
transmit, to a network entity, an indication of the size of the RIS elements;
receive, from the network entity, a set of patterns representing one or more active RIS elements or one or more inactive RIS elements, based on the size of the RIS elements; and
receive, from the network entity, via a medium access control (MAC) control element (CE), an indication of a subset of the set of patterns.

14. The apparatus of claim 13, wherein the at least one processor is further configured to: receive, from the network entity, via at least one of a downlink control information (DCI) or a medium access control (MAC) control element (CE), an indication of one of the subset of the set of patterns selected for a predefined duration of time.

15. The apparatus of claim 13, wherein a coefficient value of the one or more inactive RIS elements is determined using a function, and wherein the function is based at least on a coefficient value of the one or more active RIS elements.

16. The apparatus of claim 15, wherein the coefficient value is at least one of: a phase value, an amplitude value, a magnitude value, or a scale value.

17. A method for wireless communication by a network entity, comprising:
defining a size of reconfigurable intelligent surface (RIS) elements;
defining a set of patterns, via a radio resource control (RRC) configuration, representing one or more active RIS elements or one or more inactive RIS elements, based on the size of the RIS elements;
transmitting, to a RIS controller, an indication of the size of the RIS elements and the set of patterns; and
transmitting, to the RIS controller, via a medium access control (MAC) control element (CE), an indication of a subset of the set of patterns.

18. The method of claim 17, further comprising transmitting, to the RIS controller via at least one of a downlink control information (DCI) or a medium access control (MAC) control element (CE), an indication of one of the subset of the set of patterns selected for a predefined duration of time.

19. The method of claim 18, further comprising training surface configuration of the RIS elements during the predefined duration of time.

20. The method of claim 17, wherein a coefficient value of the one or more inactive RIS elements is determined using a function, and wherein the function is based at least on a coefficient value of the one or more active RIS elements.

21. The method of claim 20, wherein the coefficient value is at least one of: a phase value, an amplitude value, a magnitude value, or a scale value.

22. The method of claim 17, further comprising:
transmitting, to the RIS controller, one or more reference signals (RSs) to train the RIS elements, wherein a plurality of functions are implemented to train the RIS elements using the one or more RSs; and
selecting one of the plurality of functions, based on one or more of a reference signal received power (RSRP), a reference signal received quality (RSRQ), and a signal to noise and interference ratio (SINR), determined during the training of the RIS elements using the plurality of functions.

23. The method of claim 22, wherein a coefficient value of the one or more inactive RIS elements is determined using a selected function.

24. The method of claim 17, wherein a function is determined and parametrized based on one or more of: a channel type, a channel average delay, a delay spread, a Doppler spread, and a Doppler shift.

* * * * *